United States Patent
Gass et al.

(10) Patent No.: US 8,646,369 B2
(45) Date of Patent: Feb. 11, 2014

(54) TABLE SAW GUARDS, SPLITTER ASSEMBLIES, ACCESSORIES, AND TABLE SAWS INCLUDING THE SAME

(75) Inventors: Stephen F. Gass, Wilsonville, OR (US); David S. D'Ascenzo, Portland, OR (US)

(73) Assignee: SD3, LLC, Tualatin, OR (US)

( * ) Notice: Subject to any disclaimer, the term of this patent is extended or adjusted under 35 U.S.C. 154(b) by 1645 days.

(21) Appl. No.: 11/906,430

(22) Filed: Oct. 1, 2007

(65) Prior Publication Data
US 2009/0084240 A1    Apr. 2, 2009

(51) Int. Cl.
*B26D 1/14*    (2006.01)

(52) U.S. Cl.
USPC ............................................ 83/477.2; 83/478

(58) Field of Classification Search
USPC ....................... 83/477.2, 490, 581, 478, 102.1
See application file for complete search history.

(56) References Cited

U.S. PATENT DOCUMENTS

| | | | |
|---|---|---|---|
| 264,412 A | 9/1882 | Kuhlmann | |
| 997,720 A | 7/1911 | Troupenat | |
| 1,148,169 A | 7/1915 | Howe | |
| 1,563,317 A | 12/1925 | Auel | |
| 2,075,282 A | 3/1937 | Hedgpeth | |
| 2,095,330 A | 10/1937 | Hedgpeth | |
| 2,121,069 A | 6/1938 | Collins | |
| 2,352,235 A * | 6/1944 | Tautz | 83/102.1 |
| 2,466,325 A * | 4/1949 | Ocenasek | 83/102.1 |
| 2,593,596 A * | 4/1952 | Olson | 83/102.1 |
| 4,453,112 A | 6/1984 | Sauer et al. | |
| 4,721,023 A | 1/1988 | Bartlett et al. | |
| 5,123,317 A | 6/1992 | Barnes, Jr. et al. | |
| 5,230,269 A | 7/1993 | Shiotani et al. | |
| 5,857,507 A | 1/1999 | Puzio et al. | |
| 6,131,629 A | 10/2000 | Puzio et al. | |
| 6,736,042 B2 | 5/2004 | Behne et al. | |
| 6,796,208 B1 | 9/2004 | Jorgensen | |
| 7,000,515 B2 | 2/2006 | Jorgensen | |
| 7,437,981 B2 | 10/2008 | Burke et al. | |
| 2004/0255745 A1 * | 12/2004 | Peot et al. | 83/102.1 |
| 2007/0000366 A1 | 1/2007 | Peot et al. | |

(Continued)

FOREIGN PATENT DOCUMENTS

| | | |
|---|---|---|
| DE | 3137732 | 9/1983 |
| DE | 8807584 | 9/1988 |

(Continued)

OTHER PUBLICATIONS

The INCA Woodworking Machinery Handbook—With Useful Tips and Jigs for Everyone, *INCA Maschinen*, 1984.

(Continued)

*Primary Examiner* — Ghassem Alie

(57) ABSTRACT

Table saw blade guards, splitter assemblies, attachments, accessories, and table saws including the same. The splitter assemblies include a splitter and a blade guard that is coupled to the splitter. The blade guards include a top guard. In some embodiments, the top guard is configured to be a hold-down guard. In some embodiments, the top guard is pivotally coupled to the splitter. In some embodiments, the top guard is adjustably coupled to the splitter. In some embodiments, the top guard is secured in a fixed orientation relative to the splitter. In some embodiments, the top guard includes a portion that is secured in a fixed orientation to the splitter and a portion that is pivotal relative to the splitter.

12 Claims, 8 Drawing Sheets

(56) References Cited

U.S. PATENT DOCUMENTS

| | | | |
|---|---|---|---|
| 2007/0113714 A1 | 5/2007 | Burke et al. |
| 2007/0113715 A1 | 5/2007 | Burke et al. |
| 2007/0163408 A1 | 7/2007 | Buck et al. |
| 2007/0186739 A1 | 8/2007 | Peot et al. |
| 2007/0186741 A1 | 8/2007 | Buck et al. |
| 2007/0277661 A1 | 12/2007 | Domeny et al. |
| 2008/0022827 A1 | 1/2008 | Weir et al. |

FOREIGN PATENT DOCUMENTS

| | | |
|---|---|---|
| DE | 4205965 C1 | 2/1992 |
| DE | 9306198 | 4/1993 |
| WO | WO 03/006213 | 1/2003 |

OTHER PUBLICATIONS

SI16WA-WF Circular Saw with Tilting Blade Spare Parts Catalogue, SCMI Corporation, Norcross, GA, Nov. 1986 and 1991.

Inca 2200 Table Saw Photo of Internal Mechanisms, around 1992.

Inca 2100SE Blade Guard Photos, 1992.

Inca 2100SE Professional Tablesaw Owners Manual, Injecta Machinery, 1992.

Skil Model 3400-Type 1 10" Table Saw Parts List and Technical Bulletin, S-B Power Tool Company, Jun. 1993.

SI320 Circular with Tilting Blade Spare Parts Catalogue, SCM, Dec. 23, 1998.

SI3200/3800 Circular with Tilting Blade Spare Parts Catalogue, SCM, Dec. 23, 1998.

Grizzly Industrial, Inc. Heavy-Duty 12" Table Saw Model G5959 and G9957 Parts List, 1998 and Oct. 2001.

Altendorf publication, Wilhelm Altendorf GmbH & Co. KG, Minden, Germany, 1999.

SI300N Circular with Tilting Blade Spare Parts Catalogue, SCM, Jun. 12, 2000.

Bosch Model 4000 Worksite Table Saw Operating/Safety Instructions, S-B Power Tool Company, Jul. 2000.

Two photographs of a saw displayed at a trade show on Aug. 23, 2000.

SI400N Circular with Tilting Blade Spare Parts Catalogue, SCM, Sep. 19, 2000.

DeWalt Woodworker's Table Saw DW746 Instruction Manual, DeWalt Industrial Tool Co., 2000.

SC 3W Circular Saw Manual, SCM Group S.p.A Divisione Minimax—Samco, Feb. 2001.

Ryobi 10" Table Saw BT3000 Operator's Manual, Ryobi Technologies, Inc., Mar. 2001.

SI450E Circular with Tilting Blade Spare Parts Catalogue, SCM, Apr. 26, 2001.

Bosch 10" Table Saw Model 0601476139 Parts List and Technical Bulletin, S-B Power Tool Company, Apr. 2001.

Powermatic 10" Tilting Arbor Saw Model 66 Instruction Manual & Parts List, JET Equipment & Tools, Jun. 2001.

Skil Model 3400 Table Saw Operating/Safety Instructions, S-B Power Tool Co., Sep. 2001.

Tablesaw Splitters and Blade Covers, *Fine Woodworking*, pp. 77-81, Dec. 2001.

The Merlin Splitter by Excalibur a Sommerville Design Product Overview & Generic Installation Notes, Sommerville Design & Manufacturing Inc., at least as early as 2002.

Ryobi 10" Table Saw BT3100 Operator's Manual, Ryobi Technologies, Inc., Aug. 2002.

Rojek KPF 300A-xxxx-RN-1P3 Table Saw/Shaper Combination Machine specification sheet, Sep. 30, 2002.

Laguna Tools Signature Series by Knapp, Oct. 21, 2002.

Rojek Circular Saw PK 300 Spare part catalogue, Apr. 14, 2003.

Ridgid TS3650 Operators Manual 10" Cast Iron Table Saw, May 2003, Jun. 2003 and Jul. 15, 2003.

Porter-Cable Double Insulated 10" Bench Top Table Saw Instruction Manual, Porter-Cable Corporation, Sep. 15, 2003.

SI300S-SI300S4 Circular with Tilting Blade Spare Parts Catalogue, SCM, Oct. 30, 2003.

Delta Biesemeyer 10" Table Saw Blade Guard Systems Instruction Manual, Delta Machinery, May 9, 2005.

Powermatic WMH Tool Group Operating Instructions and Parts Manual 10-inch Cabinet Saw Model 2000, Nov. 2005.

Makita Model 2704 Exploded Drawings and Parts List, Nov. 2005.

Porter-Cable 10" Portable Table Saw 3812, Porter-Cable Corporation, 2005.

Porter Cable 10" Portable Table Saw Model 3812 Parts List with Guard Exploded View, 2005.

Grizzly Industrial, Inc. Model G0605X/G0606X Extreme Series 12" Table Saw Owner's Manual, Grizzly Industrial, Inc., Oct. 2006.

Riving Knives—Not Just for the Europeans Anymore, *Popular Woodworking*, Jul. 20, 2007.

WoodNet Forums Woodworking Talk Forum, posting dated Jan. 9, 2008.

Grizzly Industrial, Inc. Model G0651/G0652 10" Extreme Series Table Saws Owner's Manual, Grizzly Industrial, Inc., Mar. 2008.

SCM SI 450 Circular saw with tilting blade product brochure, Villa Verucchio, Italy, undated.

SCM Group publication, Rimini, Italy, undated.

Makita Table Saw 2704 Instruction Manual, Makita Corporation of America, date unknown.

Laguna Tools table saw owner's manual, date unknown.

\* cited by examiner

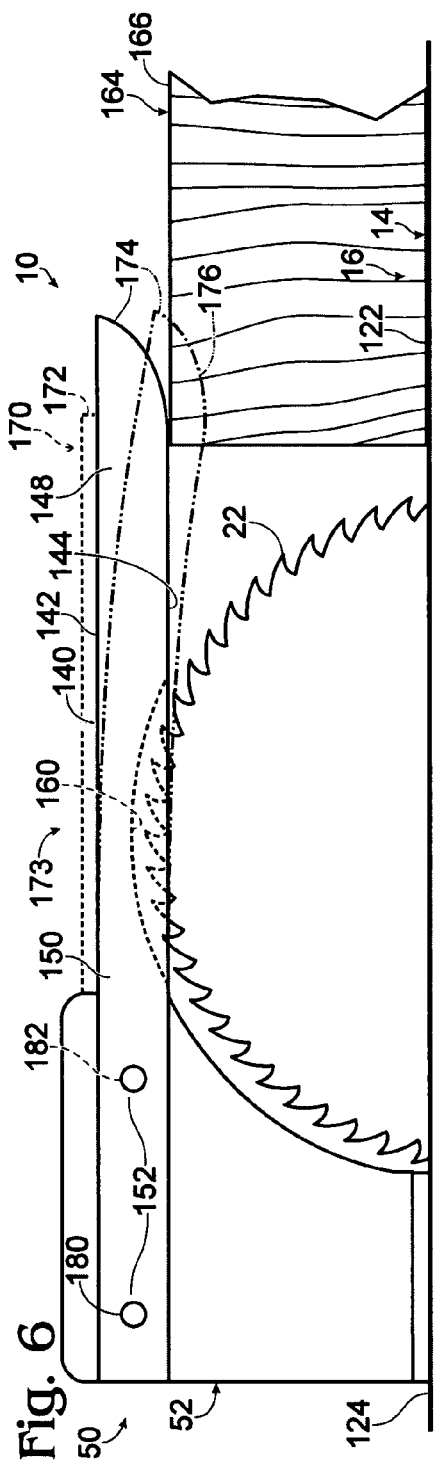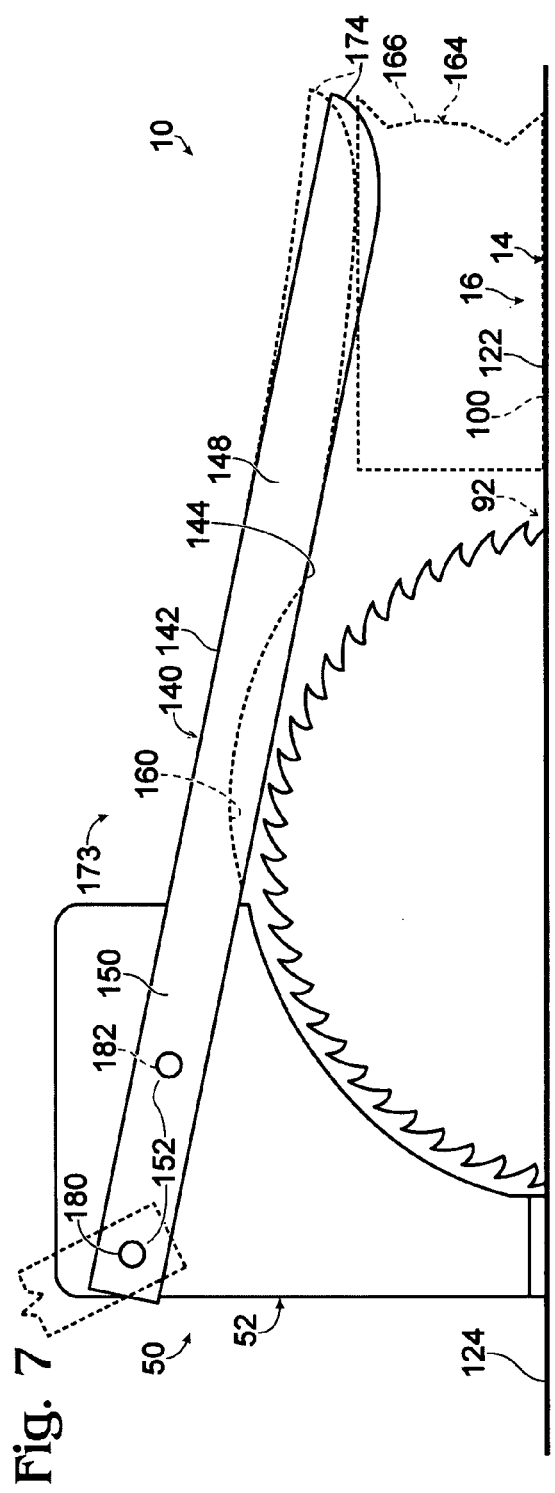

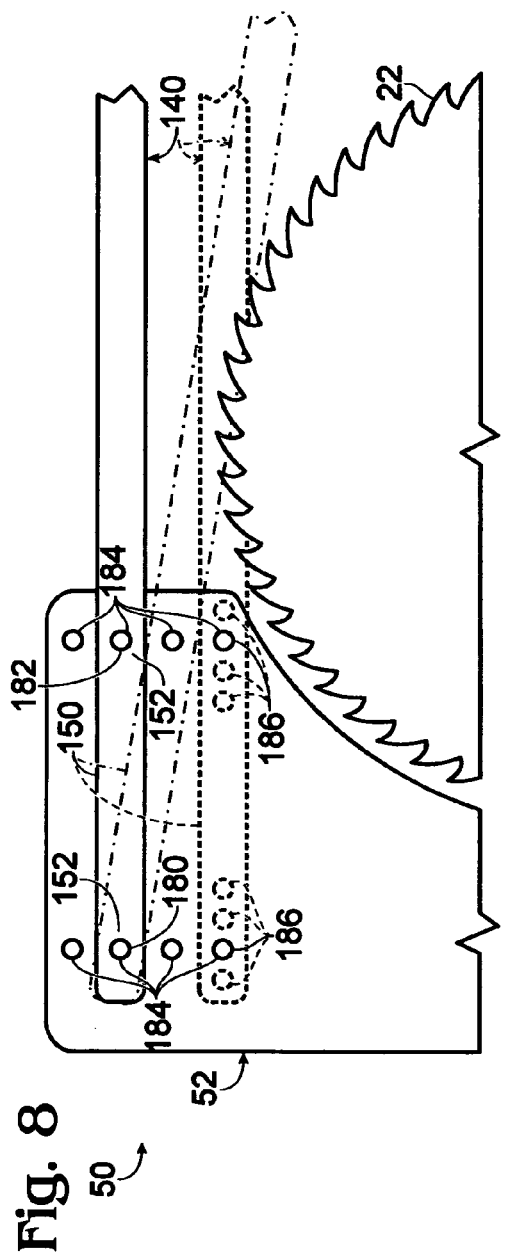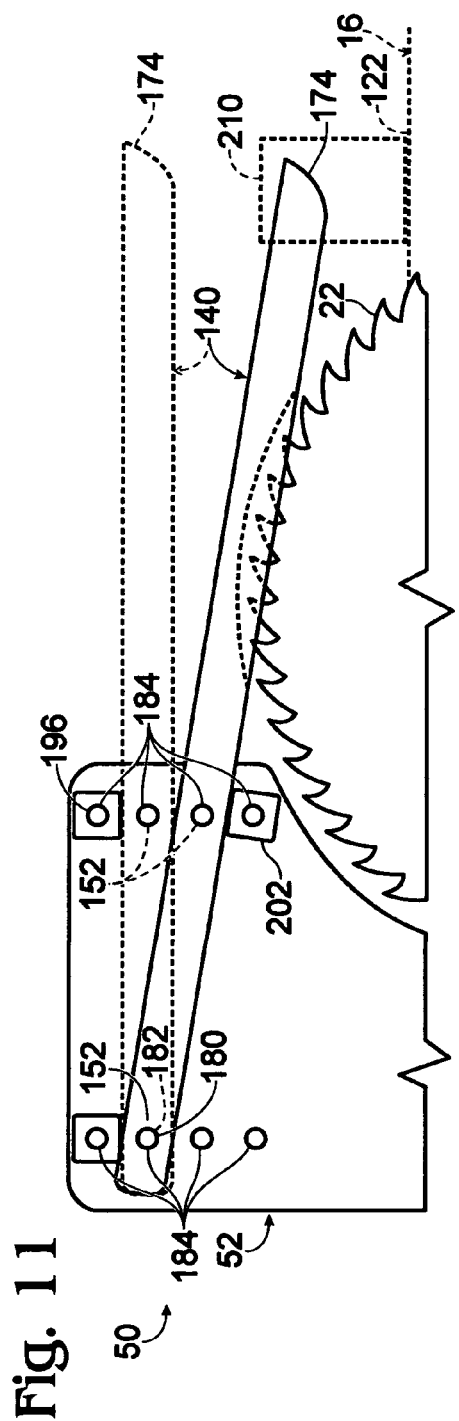

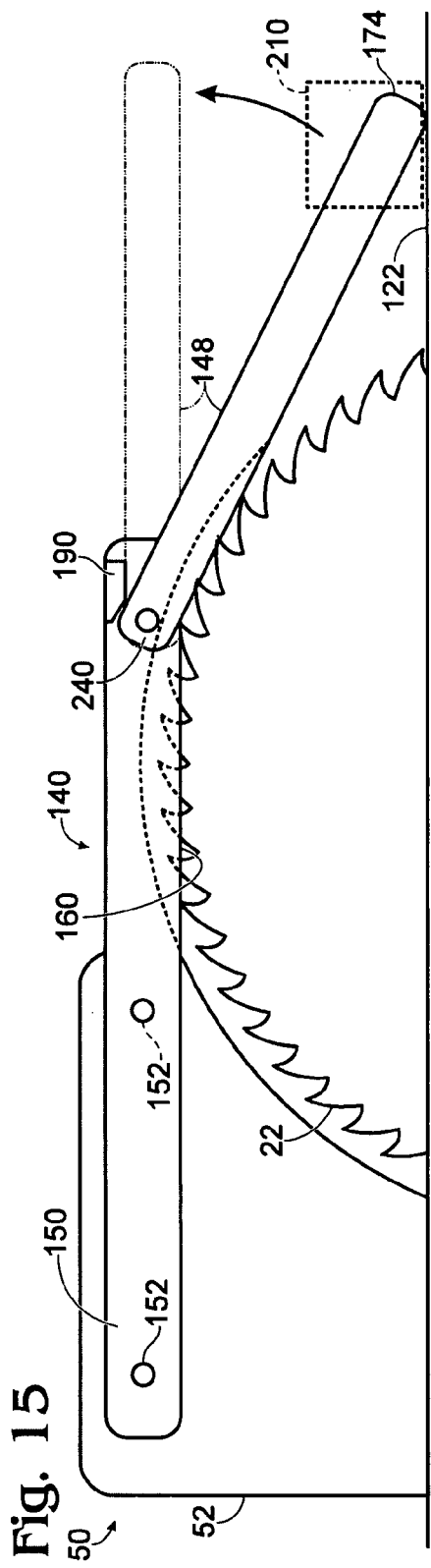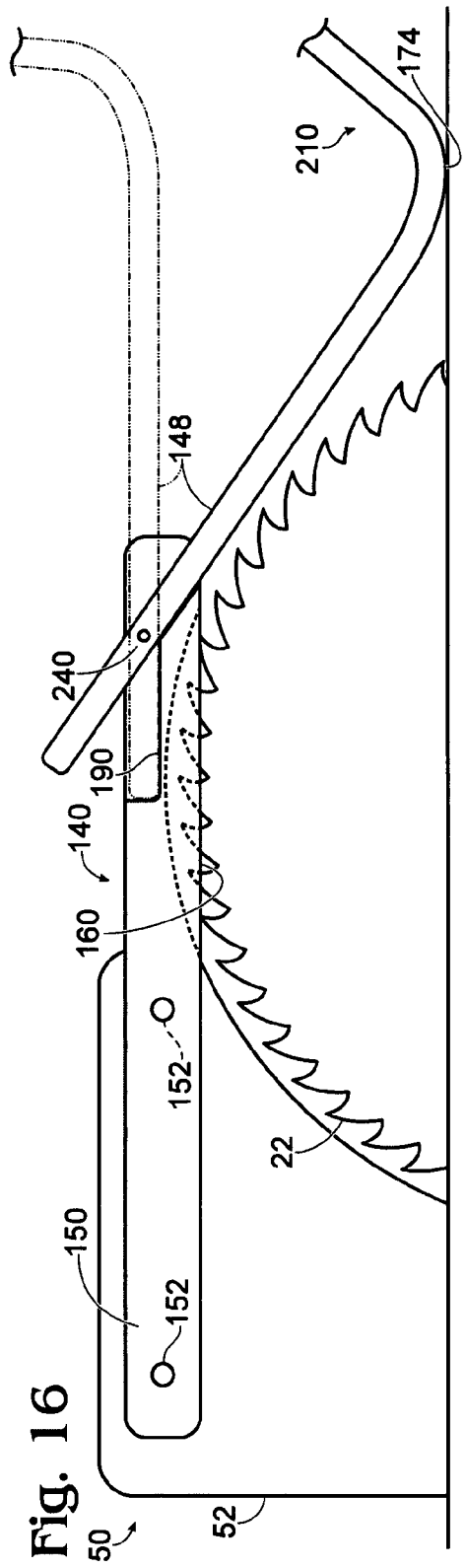

TABLE SAW GUARDS, SPLITTER ASSEMBLIES, ACCESSORIES, AND TABLE SAWS INCLUDING THE SAME

FIELD OF THE DISCLOSURE

The present disclosure is directed generally to table saw guards, to accessories for table saws and table saw guards, and to table saws that include the same.

BACKGROUND OF THE DISCLOSURE

A table saw is a power tool used to cut a workpiece to a desired size or shape. The workpiece may be formed from a variety of materials, including wood, laminates, plastic, metal, combinations thereof, and the like. A table saw includes a work surface, or table, and a circular blade extending up through the table. A person uses a table saw by holding a workpiece on the table and feeding it past the spinning blade to make a cut in the workpiece.

The table saw is an essential piece of woodworking equipment and has been so for decades. Despite the long-time and widespread use of table saws, the blade of a table saw presents a considerable risk of injury to a user of the saw. If the user accidentally places the user's hand in the path of the blade, or if the user's hand slips or is otherwise thrust into contact with the blade, then the user could receive a serious injury or amputation. Accidents also happen because of what is called kickback. Kickback may occur when a workpiece contacts the downstream edge of the blade as it is being cut. The blade then propels the workpiece back toward the user at a high velocity. When this happens, the user's hand may be carried into the blade because of the sudden and unexpected movement of the workpiece. Additionally, the user may be injured when contacted by the workpiece that is propelled toward the user by the spinning blade.

Safety systems or features may be incorporated into table saws to reduce the risk of injury. Probably the most common safety feature is a guard that physically blocks an operator from making contact with the blade. In many cases, guards effectively reduce the risk of injury; however, there are many instances where the nature of the operations to be performed precludes using a guard that completely blocks access to the blade. In still other instances, the guard is not present on the table saw due to a user deciding not to use the guard regardless of the cutting operation being performed. In many of these instances, this choice may have been predicated upon conventional guards being perceived by the user as being bulky, inconvenient to use, and/or obstructing the user's view of the workpiece as it is cut by the spinning blade of the table saw.

Another safety device that is sometimes incorporated into table saws is a spreader, or splitter. A splitter is a flat plate, similar to a riving knife, but typically extending above the top-to-bottom cutting capacity of the blade so that a blade guard can be mounted thereto. Some splitters and/or guards include anti-kickback devices that are configured to restrict a workpiece from being propelled back toward a user by the spinning blade. An illustrative example of a conventional anti-kickback device is an anti-kickback pawl, which is a toothed pawl that is positioned to oppose a workpiece being thrown back toward a user.

Other safety systems have been developed to detect when a human body contacts a predetermined portion of a machine, such as detecting when a user's hand touches the moving blade of a saw. When that contact is detected, the safety systems react to minimize injury. These systems may be used in conjunction with table saw attachments such as blade guards, riving knives, splitters and anti-kickback pawls.

The present document discloses improved table saw guards, table saw attachments, and table saws that include the same.

BRIEF DESCRIPTION OF THE DRAWINGS

FIG. 3 is a partially schematic, fragmentary side elevation view of a portion of a table saw with a splitter assembly according to the present disclosure.

FIG. 4 is a top plan view of portions of a splitter assembly according to the present disclosure.

FIG. 5 is a partially schematic, fragmentary side elevation view of a portion of a table saw with another splitter assembly according to the present disclosure.

FIG. 6 is a side elevation view of an illustrative, non-exclusive example of a splitter assembly according to the present disclosure.

FIG. 7 is a side elevation view of another illustrative, non-exclusive example of a splitter assembly according to the present disclosure.

FIG. 8 is a fragmentary side elevation view of another illustrative, non-exclusive example of a splitter assembly according to the present disclosure.

FIG. 11 is a fragmentary side elevation view of another illustrative, non-exclusive example of a splitter assembly according to the present disclosure.

FIG. 15 is a side elevation view of another illustrative, non-exclusive example of a splitter assembly according to the present disclosure.

FIG. 16 is a side elevation view of another illustrative, non-exclusive example of a splitter assembly according to the present disclosure.

DETAILED DESCRIPTION AND BEST MODE OF THE DISCLOSURE

Figure 1:
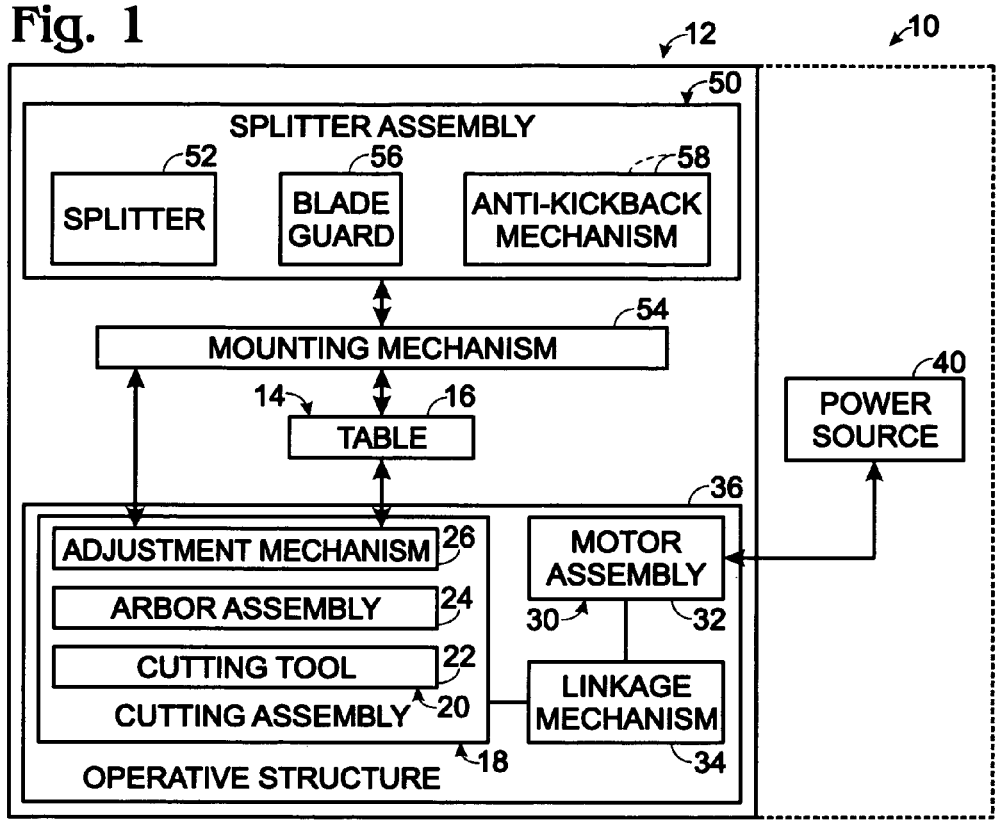
FIG. 1 is a schematic diagram of an illustrative, non-exclusive example of a table saw that may incorporate or be used with table saw guards and accessories according to the present disclosure.

An illustrative, non-exclusive example of a table saw 10 with which the blade guard and accessories described and/or illustrated herein may be used or otherwise incorporated is schematically illustrated in FIG. 1 and generally indicated at 10. Table saw 10 includes a housing, or body, 12 with a table 14 that defines a work surface 16. Work surface 16 typically is a planar, horizontally oriented surface that supports a workpiece to be cut by the table saw. The size of the work surface may vary, such as depending upon the size and power output of the table saw, with illustrative examples ranging from approximately a few hundred square inches to approximately a thousand square inches to several thousand square inches. Illustrative, non-exclusive examples of workpieces that may be cut with table saw 10 include wood, laminates, composite materials, plastic, metal, and combinations thereof.

Table saw 10 includes a cutting assembly 18 that is adapted to cut a workpiece as the workpiece is contacted by the cutting assembly during powered operation of the table saw. Cutting assembly 18 includes a cutting tool 20, such as a blade 22, which extends at least partially above the work surface when the table safe is used to cut a workpiece. For the purpose of simplicity, the following discussion will refer to the cutting tool as being a circular saw blade. However, other cutting tools may be utilized without departing from the scope of the present disclosure. Blade 22 has a circular, or nominally circular, shape, and has opposed sides. Blade 22 typically has a plurality of teeth, or cutting surfaces, that extend around the parametrical edge of the blade to define a cutting region of the blade and which are oriented to cut the workpiece as the blade is rotated and contacted by the workpiece.

Cutting assembly 18 may include an arbor, or arbor assembly, 24 upon which the blade is supported relative to the work surface. The maximum distance that the blade extends above the work surface may be fixed, although cutting assembly 18 and/or table saw 10 may include a blade adjustment mechanism 26 that enables adjustment of at least the maximum height that the blade extends above the work surface and/or the angle at which the plane, or faces, of the blade extend(s) relative to the work surface. In many table saws, the adjustment mechanism enables the blade to be selectively retracted so that the blade does not extend above the work surface, which in some embodiments means that the blade is retracted completely beneath the work surface and/or the upper surface of the table. Blade adjustment mechanism 26 may be described as being configured to change the orientation of the blade relative to the work surface, such as by raising, lowering, and/or tilting the blade relative to the work surface. Blade adjustment mechanism 26 may include any suitable mechanism or structure for producing this movement of the blade within a range of operable positions, such as responsive to user inputs to one or more user controls. Blade adjustment mechanism 26 may be referred to as just an adjustment mechanism, such as when used with cutting tools other than blades.

Some table saws include a work surface that is stationary, or fixed, in relative position with respect to the non-rotating blade, while others may include a work surface that is configured to slide, or translate, relative to the blade and/or rest of the body of the table saw. In the former embodiment, the workpiece is cut by sliding it along the work surface and into contact with the spinning blade. In the latter embodiment, the workpiece is supported upon the work surface, and then the work surface and workpiece are slid as a unit to bring the workpiece into contact with the spinning blade. This latter type of table saw may be referred to as a sliding table saw.

Table saw 10 includes a motor assembly 30 having at least one motor 32 that is adapted to drive the rotation of the blade or other cutting tool such that the workpiece is cut when it is moved into contact with the spinning blade or other cutting tool. The rotational output of the motor assembly is directly or indirectly coupled to the blade to drive the rotation of the blade. For example, table saw 10 may include a suitable linkage mechanism 34, such as one or more belts, gears, pulleys, and the like, that convey the rotational output of the motor assembly to the blade to cause rotation of the blade. In many table saws, the motor assembly drives the rotation of the arbor assembly upon which the blade is supported. Rotation of the arbor assembly results in rotation of the blade. Motor assembly 30, cutting assembly 18, and linkage mechanism 34 (if present) may collectively be referred to herein as an operative structure, or operative cutting structure, 36 of the table saw.

Motor assembly 30 is powered by a power source 40, such as a suitable electrical power source. Power source 40 may be an external power source, such as line current, or an internal power source, such as a battery. Alternatively, power source 40 may include a combination of both external and internal power sources. Furthermore, power source 40 may include two or more separate power sources, each adapted to power different portions of table saw 10.

Also schematically illustrated in FIG. 1 is a splitter assembly 50. Splitter assembly 50 includes a splitter 52 that is positioned rearward of the blade so that the workpiece passes by the splitter after it has been cut by the blade. Splitter 52 functions to maintain separation between the regions of the workpiece that have been cut by the blade, such as to prevent these regions from impinging upon the rear surface, or outfeed portion, of the blade. Splitter 52 may also be referred to as a spreader, and splitter assembly 50 may therefore also be referred to as a spreader assembly. Splitter assembly 50 is coupled, typically removably, to the table saw by a mounting mechanism 54. Mounting mechanism 54 supports and positions the splitter assembly relative to the blade (or other cutting tool) of the table saw. Mounting mechanism 54 may include any suitable structure and/or may utilize any suitable mechanism to removably secure the splitter to the table saw, such as to body 12, table 14, or to components of the table saw that are beneath the table. In some embodiments, mounting mechanisms 54 may be located beneath the work surface or table of the table saw, such as within the body, or cabinet, of the table saw.

In some embodiments, the mounting mechanism may removably secure the splitter to the blade adjustment mechanism. In such an embodiment, this may configure the splitter, and in many embodiments the entire splitter assembly, to move with the blade. By this it is meant that the orientation of the splitter assembly relative to the work surface may be changed as the orientation of the blade relative to the work surface is changed. As illustrative examples, the blade adjustment mechanism may cause the blade and the splitter assembly to be raised, lowered, and/or titled relative to the work surface. As used herein, references to tilting of the blade relative to the work surface mean that the angle defined between the work surface and the plane of the blade is selectively increased or decreased, with this angle being 90°, or approximately 90°, when the blade is in an upright position, or upright orientation, relative to the work surface.

As schematically illustrated in FIG. 1, splitter assembly 50 further includes a blade guard 56 and may include at least one anti-kickback mechanism 58. It is within the scope of the present disclosure that the disclosed blade guards and/or splitter assemblies may be utilized without one or more of the disclosed anti-kickback mechanisms, and vice versa. In some embodiments, the anti-kickback mechanism, when present, is integrated into the blade guard or splitter. As discussed in more detail herein, blade guard 56 extends at least above the blade to provide a physical, or structural, barrier to obstruct a user's body from contacting the blade. Anti-kickback mechanism 58 is configured to prevent the workpiece, at least after having been cut by the blade, from being propelled toward the user, typically at a high velocity.

Figure 2:
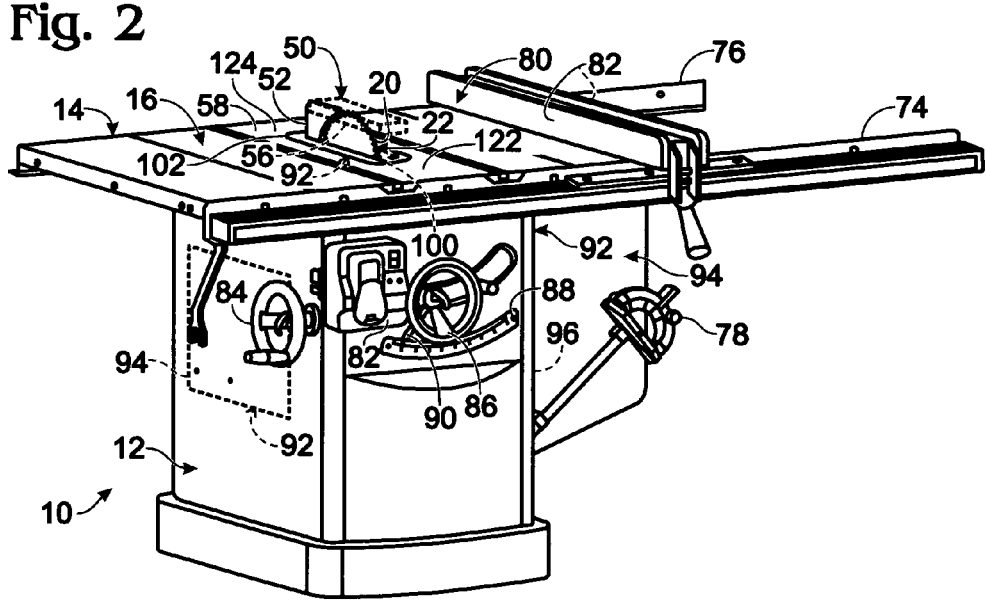
FIG. 2 is an isometric view of another illustrative, non-exclusive example of a table saw with a splitter assembly according to the present disclosure.

In FIG. 2, a less schematic example of a table saw 10 that may include, or be used with, blade guards 56 and splitter assemblies 50 according to the present disclosure is shown. Illustrative, non-exclusive examples of many of the various components that were schematically represented in FIG. 1 are shown in FIG. 2. In FIG. 2, table saw 10 is shown with a work surface 14 that includes an infeed region 122 and an outfeed region 124. The infeed region refers generally to the portion of the work surface that a workpiece rests upon as the workpiece is moved into contact with the spinning blade (or other cutting tool), and the outfeed region refers generally to the portion of the work surface that the workpiece rests upon after it has been cut by the blade. Blade 22 has an orientation with respect to the work surface and is supported for rotational movement in this orientation relative to the work surface. Also shown is an illustrative, non-exclusive example of a splitter 52, such as may form a portion of a splitter assembly 50 according to the present disclosure. As discussed in more detail herein, the splitter assembly includes a blade guard 56, which may be coupled to the splitter and which may form a portion of the splitter assembly. In FIG. 2, blade guard 56 is schematically depicted.

The illustrative, non-exclusive example of a table saw 10 in FIG. 2 is shown including front and rear rails 74 and 76, a miter gauge 78, and a fence 80, although these components are not required in all embodiments. Fence 80 rests on table 14 and clamps to front rail 74. The fence provides at least one face, or surface, 82 against which a user may slide a workpiece when making a cut. Illustrative, non-exclusive examples of suitable fences are disclosed in U.S. Patent Application Publication No. 2005/0139056.

Table saw 10 may also include a switch box 82 with one or more switches or other user inputs that are selectively actuated to control the operation of the saw. Illustrative, non-exclusive examples of suitable switch boxes that are designed for use with table saws as described herein are described in U.S. Patent Application Publication No. 2005/0139459.

As discussed, the table saw may include a blade adjustment mechanism 26 that is configured to change the orientation of the blade relative to the work surface responsive to user inputs to the blade adjustment mechanism. In some embodiments, the blade adjustment mechanism may be adapted to selectively raise and lower the blade relative to the work surface. In some embodiments, the blade adjustment mechanism may be adapted to selectively tilt the blade relative to the work surface (i.e. change the angle of the plane of the blade relative to the plane of the work surface). In some embodiments, the blade adjustment mechanism is adapted to permit user-selected adjustment of both the relative height and angle of the blade relative to the work surface.

In FIG. 2, hand wheels 84 and 86 are shown. Hand wheels 84 and 86 are illustrative, non-exclusive examples of user inputs that are selectively manipulated by a user to adjust the relative orientation of the blade relative to the work surface, with wheel 84 conveying user inputs to the blade adjustment mechanism to adjust the vertical position, or height, of the blade relative to the work surface, and wheel 86 conveying user inputs to the blade adjustment mechanism to adjust the angle, or tilt, of the blade relative to the work surface. In the non-exclusive example shown in FIG. 2, an optional gauge 88 and pointer 90 are shown associated with wheel 86 to indicate to a user the selected angle of the blade relative to the work surface. For example, when the blade is tilted 45-degrees relative to the work surface, pointer 90 would point to the 45-degree mark on gauge 88.

The body, or cabinet, 12 of the table saw may include at least one opening 92 to allow access to the internal components of the saw. FIG. 2 shows table saw 10 with three illustrative, non-exclusive openings 92, and associated covers 94. The openings include a motor opening 96, an access panel opening 98, and a work surface opening, or throat, 100. Illustrative covers for each opening are also shown. Some covers, such as the motor cover and access panel cover may be mounted to the cabinet with hinges or other suitable mechanisms so the covers can pivot away from the opening. In other embodiments, the cover may be selectively secured in and/or over the opening by releasable fastening mechanisms, with the cover being selectively removed from the body of the table saw when it is desirable to access internal components of the table saw through the opening. A throat cover, or throat plate, 102 is an example of such a cover. Table saws 10 according to the present disclosure may include more or less and/or differently positioned or oriented openings and/or covers than the illustrative examples described above and/or shown in the non-exclusive example of a table saw depicted in FIG. 2.

Additional illustrative, non-exclusive examples of components that may be included in and/or used with table saws, blade guards, and/or splitter assemblies according to the present disclosure are disclosed in U.S. Patent Application Publication No. 2005/0166736. These illustrative, non-exclusive components include examples of suitable mounting mechanisms and blade adjustment mechanisms, amongst others. Additional illustrative, non-exclusive examples of table saws and components and accessories therefor, including mounting mechanisms and blade adjustment mechanisms, are disclosed in U.S. Patent Application Publication No. 2005/0166736.

Figures 3, 4, 5:
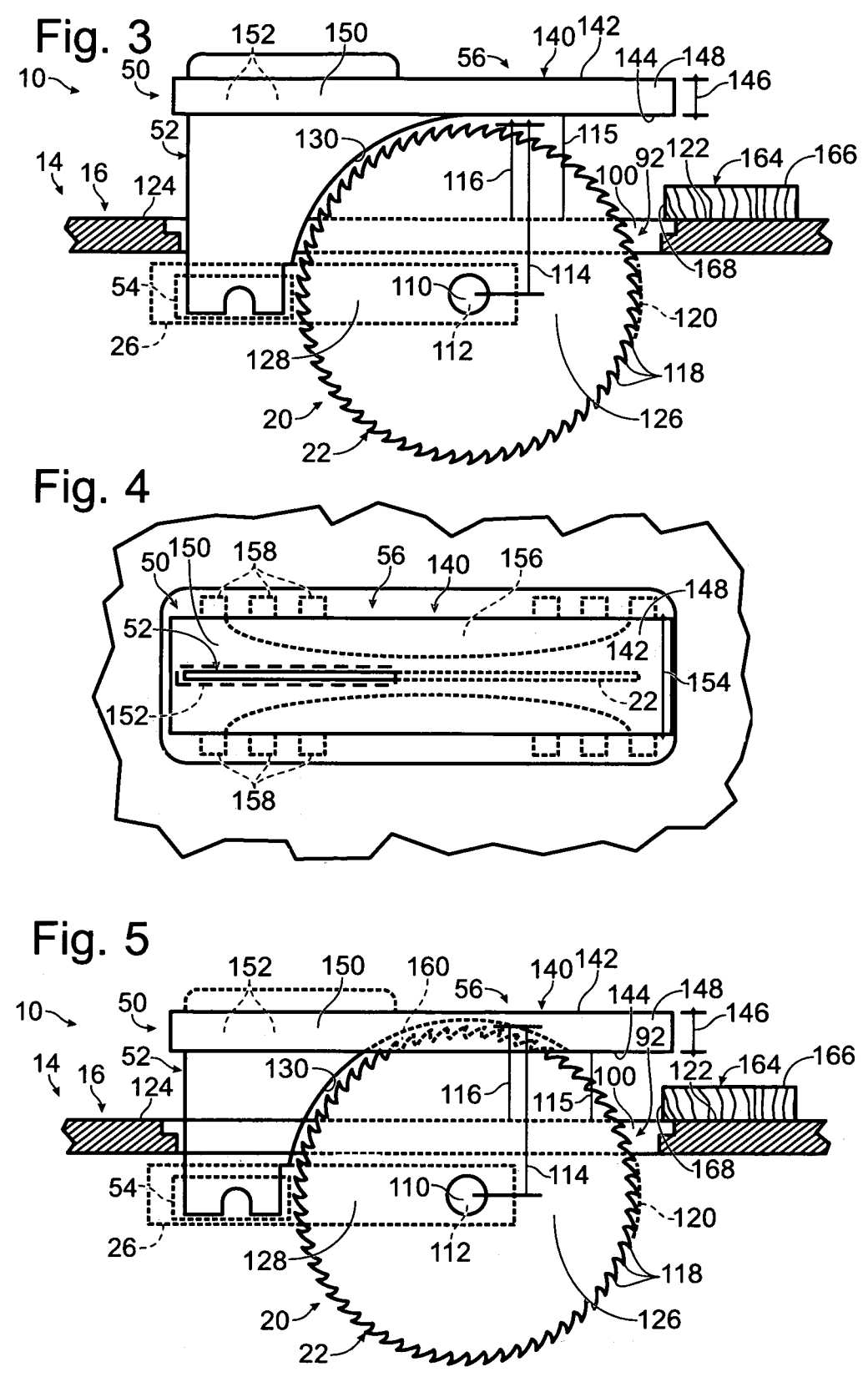

FIG. 3 illustrates a portion of a table saw 10 with a cutting tool 20 in the form of blade 22. Table saw 10 includes a table 14 with a work surface 16 having a passage, or opening, 92 in the form of a throat 100 through which a portion of a cutting tool 20 in the form of a (nominally) circular blade 22 extends. Blade 22 includes an aperture 110, through which an arbor 112 of the table saw extends. Rotation of arbor, and thus blade 22, is driven by the saw's motor assembly. The arbor is suitably coupled to the saw's blade adjustment mechanism 26 such that the relative orientation (such as the height and/or angle) of the arbor, and thus the blade, relative to the work surface 16 of the saw's table 14 may be selectively adjusted by a user. The blade adjustment mechanism is schematically illustrated in FIG. 3. As discussed, and as is also schematically illustrated in FIG. 3, the mounting mechanism for a splitter assembly 50 may also be coupled to the blade adjustment mechanism so that the splitter assembly's orientation relative to the work surface changes as the orientation of the blade and arbor changes.

In the illustrative, non-exclusive example shown in FIG. 3, blade 22 has a radius 114 and extends above work surface 16 by a distance 116. This distance will typically have a maximum value that is less than 80% of the radius of the blade, and may be reduced to zero, or even a negative distance as the blade is lowered relative to the work surface by blade adjustment mechanism 26. The illustrated blade includes a plurality of teeth 118 that are sequentially arranged around the perimeter, or perimetrical edge, 120 of the blade. The number and configuration of the teeth may vary, as some blades have different numbers and/or types of teeth, such as for use with particular types of workpieces, particular types of cutting operations, particular performance criteria, etc. Some blades do not include teeth. Some cutting tools include more than one blade, such as in the case of a dado blade that includes a plurality of generally parallel blades.

As illustrated in FIG. 3, work surface 16 may be described as having an infeed region 122 and an outfeed region 124. The infeed region of the work surface includes the portion of the work surface upon which a workpiece is supported prior to the workpiece being moved into engagement with the spinning blade to cut the workpiece with the blade, and the outfeed region of the work piece includes the portion of the work surface upon which the work piece is supported after the workpiece has been cut by the blade. Blade 22 may accordingly be described as having an infeed portion 126 and an outfeed portion 128, with these portions generally referring to regions of the blade that, at any given time, respectively are oriented toward, or face, the infeed and outfeed regions of the work surface. In FIG. 3, a workpiece 164 is shown positioned on infeed region 122 of the work surface, with the workpiece including a top surface 166 and a leading edge 168.

As discussed, splitter assembly 50 includes a splitter 52 that is positioned adjacent the outfeed portion of the blade by a mounting mechanism 54, which is schematically illustrated. The mounting mechanism may additionally or alternatively be described as being configured to position the splitter adjacent to the blade distal the infeed portion of the blade and/or distal the infeed region of the work surface. As illustrated, the splitter includes a leading edge 130 that is positioned near, but spaced-apart from, the perimetrical edge of the blade. In this configuration, the spinning blade does not contact the splitter, but the cut portions of the workpiece will contact the splitter before contacting the teeth in the outfeed portion of the blade in a manner that may cause kickback of the workpiece.

In FIG. 3, splitter 52 is indicated as forming a portion of a splitter assembly 50 that also includes a blade guard 56 that extends from the splitter generally toward the infeed region of the work surface. By this it is meant that the blade guard extends at least over the upper surface of the saw blade, and thereby extends from the splitter toward the infeed region of the work surface. The relative height and angle of the blade guard relative to the infeed and/or outfeed region of the work surface may vary within the scope of the present disclosure, as discussed in more detail herein.

The blade guard includes at least a top guard 140 that extends over at least the upper surface of the saw blade. Additionally or alternatively, the top guard may be described as extending over the portion of the blade that projects above the work surface. The top guard has a thickness 146 measured between its top and bottom regions, or extents, which in the illustrated, non-exclusive example, take the form of upper and lower surfaces 142 and 144. Other constructions may be utilized, such as top guards that include one or more rods, wireforms, trusses, frameworks, or the like. Accordingly, the upper and lower surface of the top guard may respectively refer to a physical surface of the top guard or to a projection defined across spaced-apart upper or lower regions of the top guard. As illustrated in FIG. 3, the top guard has a uniform thickness along its length, but this is not required to all embodiments.

Splitter 52 will typically be formed from metal, but this is not required. Top guard 142 may be formed from any suitable material, or combinations of materials, and may be formed from a single component, or a series of interconnected components. Illustrative, non-exclusive examples of suitable materials include metals, plastics, curable polymers, and the like. In some embodiments, at least one (if not both) of the infeed guard portion and the outfeed guard portion may be formed as a monolithic structure and/or from a single material. In some embodiments, the top guard may be formed from two or more different materials. In some embodiments, top guard may be at least partially, if not substantially or even completely, formed from a transparent material that permits a user to see the blade (and adjacent region of the work surface and any workpiece being cut) through the top guard. An illustrative example of such a material is polycarbonate, but others may be used.

The top guard includes an infeed guard portion 148 and an outfeed guard portion 150. The outfeed guard portion is coupled to the splitter and extends therefrom to or toward the infeed guard portion. The outfeed guard portion may be coupled to the splitter by any suitable type and number of fastening mechanisms 152. Illustrative, non-exclusive examples of suitable fastening mechanisms include permanent fastening mechanisms and reusable fastening mechanisms. Permanent fastening mechanisms are fastening mechanisms that secure the outfeed guard portion to the splitter such that the outfeed guard portion may not be separated from the splitter without damaging or destroying at least a portion of the infeed guard portion, the splitter, and/or the fastening mechanism. Illustrative, non-exclusive examples of permanent fastening mechanisms include welds, adhesive and/or chemical bonds, and cured or molded interconnections between the splitter and the outfeed guard portion. Reusable fastening mechanisms are fastening mechanisms that are constructed to permit user-selected removal of the top guard from the splitter, and reattachment of the top guard thereto, without destruction or damage to the top guard, splitter, and/or top guard. Illustrative, non-exclusive examples of reusable fastening mechanisms include threaded fasteners, such as screws and bolts, and corresponding threaded sockets or nuts, clamps, pins, and the like. Reusable fastening mechanisms may also be referred to as releasable fastening mechanisms. At least reusable fastening mechanisms may optionally include a handle, user-grippable region, or other portion or mechanism to assist a user in removing the fastening mechanism without requiring the use of tools.

When the top guard is coupled to the splitter with a reusable fastening mechanism, at least one of the top guard, the splitter, and the fastening mechanism may be configured to permit selective positioning and securement of the top guard relative to the splitter within a range of, or in a selected one of a plurality of, top guard positions in which the top guard still extends over the top of the blade to protect a user during use of the table saw to cut a workpiece. As an illustrative, non-exclusive example, the lateral position of the top guard relative to the splitter may be adjustable within a range of positions. Such a construction may be useful when it is desirable to reduce the lateral projection of the top guard relative to a side of the blade and/or to increase the lateral project of the top guard relative to the other side of the blade. As another illustrative, non-exclusive example, the longitudinal position of the top guard relative to the splitter may be selectively adjustable, such as to accommodate user-selectively of the distance that the distal end of the infeed guard portion extends away from the infeed portion of the blade. As still another illustrative, non-exclusive example, the use of reusable fastening mechanisms may permit selective interchanging of two or more top guards, such as to accommodate different blades or cutting tools, different user preferences, different workpieces, and/or different cuts. A splitter assembly with two or more interchangeable top guards may be referred to herein as a splitter assembly kit.

FIG. 4 is a top plan view of the splitter assembly and portion of the table saw of FIG. 3. As shown, the top guard has a width 154, which is measured perpendicular to the plane of the saw blade. The width of the top guard typically will be thicker than the width, or face-to-face thickness, of the saw blade, with illustrative, non-exclusive examples including widths that are at least 1.5, 2, 5, 10, 25, 50 or more times the width of the saw blade. In FIG. 4, the top guard is illustrated as having a constant width, but it is within the scope of the present disclosure that the width of the top guard may vary within the scope of the present disclosure. As illustrative, non-exclusive examples, the top guard may be tapered in width from the infeed guard portion to the outfeed guard portion, or vice versa. As another illustrative, non-exclusive example, and as illustrated in dashed lines in FIG. 4, the central region of the top guard may have a reduced width compared to distally spaced infeed and outfeed guard portions. In such a construction, the top guard may be described as having a reduced-width central region 156 generally between the infeed and outfeed guard portions. As yet another illustrative, non-exclusive example, and as illustrated in dashed lines in FIG. 4, the top guard may include one or more projecting regions 158 that extend from one or both lateral sides of the top guard. It is also within the scope of the present disclosure that the top guard may include one or more apertures and/or channels or slots that extend into and/or through the top guard.

In FIG. 3, the lower surface 144 of the top guard is shown extending above the work surface by a height 115 that is greater than the distance 116 that the blade extends above the work surface. This construction is not required in all embodiments. In some embodiments, the splitter assembly may be constructed so that the lower surface of the top guard extends closer to the work surface of the table saw than the distance 116 that the blade extends above the work surface. An illustrative, non-exclusive example of such a top guard is shown in FIG. 5. In FIG. 5, many of the previously described components and/or elements of FIG. 3 are illustrated, but for the sake of brevity, will not be discussed again in the context of FIG. 5. In FIG. 5 the upper portion of splitter 52 is shown in dashed lines to graphically indicate that the splitter may or may not extend above the upper surface of the top guard without departing from the scope of the present disclosure.

Figure 20:
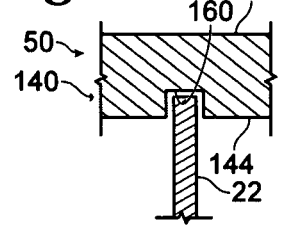
FIG. 20 is a fragmentary cross-sectional view of an illustrative, non-exclusive example of a top guard for a splitter assembly according to the present disclosure.
Figure 21:
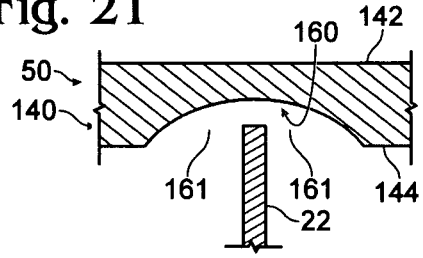
FIG. 21 is a fragmentary cross-sectional view of another illustrative, non-exclusive example of a top guard for a splitter assembly according to the present disclosure.

In the illustrative, non-exclusive example of a top guard shown in FIG. 5, the top guard includes a recess, or channel, 160 into which a portion of the blade extends, at least when the blade extends above the work surface of the table saw. In such an embodiment, the blade may be described as extending into the top guard. Additionally, or alternatively, the top guard may be described having a lower surface from which a channel or recess extends into the body of the top guard, such as generally toward the upper surface of the top guard, with at least a portion of the cutting surface of the blade extending into this recess or channel. Illustrative, non-exclusive examples of suitable configurations for channel 160 are shown in FIGS. 20 and 21. In FIG. 20, channel 160 has a slot-like, or elongate groove, configuration that closely conforms to the width of the blade. While not required, it is within the scope of the present disclosure that the cannel may be cut into the body of the top guard (i.e., the region of the top guard between its upper and lower surfaces) by the blade. Other methods may be used to form the channel in the top guard, including doing so when the top guard is formed. In FIG. 21, the channel has a dome-like, or arched, configuration in which the channel defines open passages 161 on each side of the portion of the blade that is received within the channel, with such passages extending laterally from each of the sides of the portion of the blade a distance that exceeds the thickness of the blade, and which may be twice, three times, or more than the thickness of the blade. In contrast, in FIG. 20 the channel may have a width that is not appreciably wider than the thickness of the portion of the blade that is received into the channel, such as a width that is less than twice the thickness of the portion of the blade, although larger and smaller widths remain within the scope of the present disclosure.

In some such embodiments, the lower surface of the top guard in at least one of the infeed guard portion and the outfeed guard portion may have a generally planar construction and the top guard may have a thickness that is less than 25%, or even less than 15% of the radius of the blade. Neither of these features is required to all embodiments. Positioning the lower surface of the top guard closer to the work surface results in the top guard not projecting above the work surface as much, or as far, as a similarly constructed top guard in which the blade does not extend into the top guard. Accordingly, some users may find that such a top guard is less obtrusive and/or does not obstruct the user's view of the blade as much as a higher-positioned top guard. Other users may prefer having additional clearance between the lower surface of the top guard and the work surface. Both constructions are within the scope of the present disclosure.

As discussed, splitter assemblies according to the present disclosure may be configured to move (i.e., change their vertical and/or angular configuration with respect to the work surface) with the blade, such as responsive to user inputs to the table saw's blade adjustment mechanism. Accordingly, a top guard that is configured to move as a unit with the blade may be supported, or secured, a fixed distance above the axis of the arbor of the saw, with this distance being less than the radius of the blade. This fixed distance, if implemented in a particular embodiment of a table saw according to the present disclosure, should not limit the use of the saw to cut workpieces with a variety of thicknesses, as the distance the blade extends above the work surface may be adjusted by a user to accommodate the thickness of the workpiece beneath the top guard.

In FIG. 5, the lower surface 144 of the top guard is shown positioned slightly above the upper surface 164 of a workpiece 166, with workpiece 166 also illustrated as having a leading edge 168. As discussed herein, this distance may vary within the scope of the present disclosure, such as to include distances that are more or less than the illustrated non-exclusive example. In some embodiments, at least a portion, or even all, of the lower surface may engage the upper surface of the workpiece. In some embodiments, only a region of the lower surface in the infeed guard portion of the top guard contacts the upper surface of the workpiece. In some embodiments, the lower surface of the top guard does not engage the workpiece (or may be selectively positioned by a user to not engage the workpiece) when the table saw is used to cut a workpiece with the top guard operatively positioned above the blade.

Regardless of the relative height of the top guard relative to the blade of the table saw, top guards 140 according to the present disclosure may be configured to limit the upward movement, or deflection, away from the work surface of a workpiece being cut by the saw. Limiting the upward movement of the workpiece away from the work surface may reduce or even prevent kickback of the workpiece being cut by the saw. For example, by preventing the workpiece from lifting off of the work surface, the top guard may prevent the kickback force that can be created when the work piece drops back down onto the blade, or at least the front portion thereof. Similarly, by acting as a hold down on the workpiece, the top guard can prevent the lifting action by the teeth at the back of the blade from lifting the board and causing kickback, and which might otherwise propel the workpiece upward and toward a user. As used herein, "upward," when used in the context of movement of the blade and/or movement of a workpiece relative to the work surface of a table saw, refers to movement generally perpendicular to the plane of the work surface and generally away from the base of the saw.

The illustrative top guards shown in FIGS. 3 and 5 may both be configured to be top guards that are configured to limit the upward movement of the workpiece away from the work surface. Perhaps more specifically, the top guard should be secured to the splitter in a suitable matter to provide this positive limitation to the upward movement of the workpiece. For example, the outfeed guard portion of the top guard may be secured to the splitter in a fixed orientation and/or in an orientation in which the outfeed guard portion is not freely pivotal away from the work surface relative to the splitter. Because the outfeed guard portions of the top guards are secured to the splitter such that at least the outfeed guard portions may not freely pivot away from the work surface, vertical movement of the workpiece away from the work surface is restricted when the workpiece engages the top guard. This is distinguishable from top guards that are pivotally coupled to the splitter and which may pivot away from the work surface of the table responsive to forces applied thereto, such as to the underside of the top guard. These forces may need to be sufficient to overcome the weight of the top guard to pivot the top guard away from the work surface, but otherwise such a top guard that is not a hold-down guard is not secured, biased, or otherwise configured to positively retain or limit the upward movement of a workpiece away from the work surface of the table.

The illustrative examples shown in FIGS. 3 and 5 demonstrate that the vertical distance that a workpiece is permitted to move away from the work surface may vary before it is engaged by the top guard to limit further vertical movement of the workpiece. However, both illustrated examples still positively limit the vertical movement of the workpiece and thus will prevent the workpiece from being thrust upwardly and toward a user should kickback occur.

In some embodiments, the top guard may be configured not only to limit the upward deflection of the workpiece above the work surface, but also to positively retain the workpiece against the work surface. By "positively retain," it is meant that the top guard not only engages the workpiece at least as the workpiece is being cut by the saw, but also that the top guard urges, or retains, the workpiece against the work surface with more than merely the weight of the top guard and any components attached thereto. Accordingly, a top guard that positively retains the workpiece against the work surface may be biased by a biasing mechanism of the saw to urge the workpiece against the work surface. Top guards that engage the workpiece to positively retain the workpiece against the work surface may provide additional stability and/or support to the workpiece relative to the work surface and blade of the saw.

It is within the scope of the present disclosure that a top guard that is configured to limit the upward deflection of the workpiece above the work surface may or may not engage the workpiece when the workpiece is being cut by the saw. However, such a top guard will still engage the workpiece to limit upward movement of the workpiece away from the work surface. Top guards that limit the upward movement of workpieces and top guards that positively retain the workpiece against the work surface of the saw may collectively be referred to herein as hold-down guards, even though the former example may or may not contact the workpiece until the work piece is elevated above the work surface.

The degree to which and/or force with which the top guard contacts and/or retains the workpiece against the work surface may vary within the scope of the present disclosure. For example, the top guard may initially permit a predetermined amount of elevation of the work surface, and optionally a predetermined amount of deflection or upward movement of at least the engaged portion of the top guard, and thereafter restrict further deflection or movement away from the work surface. In some embodiments, this initial range of permitted deflection of the top guard and/or elevation of the workpiece away from the work surface may be helpful, such as to accommodate variations in the workpiece thickness when the top guard is configured as a hold-down guard that contacts the workpiece as the workpiece is moved across the work surface to be cut by the saw. When it is desirable to positively restrain the workpiece against the work surface, the intentional movement of the workpiece from the infeed region to the outfeed region of the work surface by a user should not be obstructed or interfered with by the top guard. Similarly, such a top guard should also accommodate slight variations in the workpiece thickness without binding or otherwise restricting further movement of the workpiece from the infeed region of the work surface toward the spinning blade.

Some hold-down guards according to the present disclosure may be configured to apply a force to urge the workpiece against the work surface of the table. Hold-down top guards that are biased toward the work surface are illustrative, non-exclusive examples of such guards. In some embodiments, this force may be selected to be sufficient to resist elevation of the workpiece from the work surface by the blade during normal cutting of the workplace by the blade (i.e., when kickback has not occurred). In some embodiments, this force may be selected to resist elevation of the workpiece from the work surface when kickback occurs and attempts to trust thrust the workpiece upward and away from the blade. This biasing force is independent from the mere weight of the top guard, which may or may not urge the workpiece against the work surface. Illustrative, non-exclusive examples of the force applied by a hold-down guard that is configured to positively retain the workpiece against the work surface of the table include at least 1 pound of force, at least 5 pounds, at least 10 pounds, at least 25 pounds, at least 50 pounds, 1-20 pounds, 5-30 pounds, 10-50 pounds, 25-75 pounds, etc. This applied force may be selected to provide the desired retaining force while also not preventing a user from sliding a workpiece along the work surface from a position on the infeed region where the workpiece is spaced-apart from the top guard, to a position in which the workpiece extends at least partially beneath the top guard, and to a position in which the workpiece is being cut by the blade.

Additionally or alternatively, some top guards 140 according to the present disclosure may be configured to prevent upward movement of the workpiece away from the blade, either at all, or by more than a predetermined distance. As discussed herein, some examples of this latter type of hold-down guards are configured to permit an initial amount of movement of the workpiece away from the work surface of the table, but thereafter prevent further movement of the workpiece away from the work surface, such as to prevent kickback from thrusting the workpiece toward a user. Such hold-down top guards may be constructed to resist a predetermined amount of force being imparted thereto by the workpiece, such as if the workpiece is thrust generally upward and otherwise away from the blade and into contact with the top guard during kickback. By this it is meant that a workpiece that is thrust into contact with the lower surface of the top guard with a force up to such a predetermined amount of force will not cause the top guard to deflect or otherwise move away from the work surface, either at all or to a degree to permit the workpiece to be thrust upward and away from the blade more than the predetermined amount. Illustrative, non-exclusive examples of this predetermined amount of force that may be applied by a work piece against the lower surface of the top guard without causing the top guard to fail, break, or otherwise cease to be a hold-down guard include forces of at least 10 pounds, 50 pounds, 100 pounds, 200 pounds, 500 pounds, 10-100 pounds, 25-150 pounds, 50-250 pounds, 75-325 pounds, 100-200 pounds, 150-400 pounds, etc.

An illustrative example of a top guard 140 that is configured to be a hold-down guard that positively retains the workpiece 164 against the work surface 16 of the table 14 of the table saw 10 is shown in FIG. 6. As illustrated, the infeed guard portion 148 of the top guard engages the top surface 166 of the workpiece to positively retain the workpiece against work surface. In the illustrated example, the infeed guard portion is positioned to initially engage the workpiece while the workpiece is supported on the work surface and prior to the workpiece being urged into contact with the spinning blade 22 to cut the workpiece. As illustrated in dashed lines in FIG. 6, at least the infeed guard portion may be deflected away from the work surface when the infeed guard portion is engaged by the workpiece. In such an embodiment, this position may be referred to as a deflected position, whereas the position of the infeed guard portion prior to engagement and deflection by the workpiece may be referred to as a nominal, or pre-engagement, position. In some embodiments, the top guard may be configured so that the infeed guard portion extends toward (i.e., at a convergent angle with) the infeed portion of the work surface when the infeed guard portion of the top guard is in its nominal position.

When the infeed guard portion is configured to be deflected away from its nominal position upon engagement with the workpiece, the top guard may be configured so that the infeed guard portion has a limited range of deflection. Illustrative, non-exclusive examples include a deflected position in which the infeed guard portion extends in a generally horizontal orientation, in a convergent plane with the plane of the work surface (as measured from the outfeed guard portion toward the infeed guard portion), or in a divergent plane with the plane of the work surface. It is within the scope of the present disclosure that the splitter assembly may (but is not required to) include a deflection stop 170, which generally refers to structure that limits the degree to which at least the infeed guard portion may be deflected, pivoted, or otherwise urged away from the work surface. An illustrative, non-exclusive example of a deflection stop is a rigid brace 172 that extends along or adjacent to at least a portion of the top surface 142 of the top guard. When the infeed guard portion is in the nominal position, it may extend away from the brace, such as toward the infeed region of the work surface, with the infeed guard portion being moved by contact with the workpiece toward the brace. When the infeed guard portion extends against the brace, further deflection of the infeed guard portion may be limited or completely stopped by the brace. In the illustrative, non-exclusive example shown in FIG. 6, brace 172 is positioned above the upper surface of the top guard. However, this position is not required, and it is within the scope of the present disclosure that the brace or other deflection stop, when present, may be positioned at any suitable location relative to the top guard, including positions in which the brace or other deflection stop extend into the body of the top guard, project from the top guard, are received into recesses or passages within the top guard, etc.

When top guard 140 is configured to be selectively moved between a nominal position and a deflected position, the top guard may be biased to (return to) the nominal position, such as after the workpiece is removed from the infeed region of the work surface. This optional biasing mechanism for urging the top guard from a deflected position to a nominal position is schematically indicated in FIG. 6 at 173. In such an embodiment, this biasing force exerted by the biasing mechanism may cause the infeed guard portion to exert greater force upon the top surface of the workpiece when the infeed guard portion is in the deflected position. As discussed herein, this biasing mechanism may be implemented with any suitable structure or mechanism, such as one or more of the orientation at which the top guard is mounted to splitter 52, the material(s) of construction of the workpiece, a biasing mechanism that is coupled to, or forms a part of, the top guard, a biasing mechanism that engages the top guard and the splitter, a biasing mechanism that engages the top guard and a deflection stop (when present), etc.

The infeed guard portion of the top guard, or at least an infeed end region 174 thereof, may be shaped to facilitate engagement of the workpiece and deflection of the infeed guard portion without arresting or otherwise impairing movement of the workpieoe along the work surface toward the spinning blade. Expressed in slightly different terms, when the top guard is configured to engage the workpiece as the workpiece is moved along the table and into contact with the spinning blade to cut the workpiece, the top guard should not impair or restrict this horizontal movement of the work piece. By "horizontal," it is meant movement of the work piece in a path that is parallel to the plane of the work surface. Accordingly, at least the infeed end region of the infeed guard portion 148 may have a shape to provide this automatic deflection and/or elevation of the infeed guard portion responsive to the infeed end region being engaged by the workpiece.

In the illustrative, non-exclusive example shown in FIG. 6, the infeed end region has a tapered configuration, with the thickness of the top guard decreasing toward the end of the infeed region distal the splitter. The infeed end region may additionally or alternatively have an arcuate configuration. In some examples, the thickness of the top guard in at least a portion of the infeed end region may be less than 75%, less than 50%, or even less than 25% of the maximum thickness of the top guard, than the thickness of the top guard in the outfeed guard portion of the top guard, and/or than the nominal thickness of the top guard. While not required to all embodiments, it is also within the scope of the present disclosure for such a workpiece-contacting portion of the top guard, when present, to include a friction-reducing mechanism or surface, such as an anti-friction coating or material, one or more rollers, etc. Such an optional mechanism or surface is schematically indicated in FIG. 6 at 176.

FIG. 7 provides another illustrative, non-exclusive example of a splitter assembly 50 with a splitter 52 and a top guard 140 that is configured as a hold-down guard. As illustrated, the top guard extends from the splitter at a convergent angle to the work surface, with the infeed guard portion extending closer to the work surface than the outfeed guard portion. It is within the scope of the present disclosure that the top guard of FIG. 7 may have a rigid construction, such that the orientation of top guard 140 does not change when lower surface 144 of the top guard is engaged by a workpiece. In such a construction, the height of the top guard's lower surface 144 above work surface 16 should be adjusted prior to feeding the workpiece along the work surface to ensure adequate clearance between the top surface of the workpiece and the lower surface of the top guard. As discussed, in some embodiments this distance is correlated to the distance that the blade extends above the work surface.

As a variant to the above-discussed rigid construction, in which the top guard does not deflect or otherwise move upon contact with the workpiece, it is also within the scope of the present disclosure that at least the infeed guard portion (and in some embodiments only the infeed guard portion) of the top guard is configured to deflect away from the work surface responsive to engagement with the workpiece. An illustrative graphical example of this movement is shown in dashed lines in FIG. 7. This deflection may be restricted to being within a permitted range of positions, such as with an upper, or deflected, position that still prevents the workpiece from being thrust upward and toward a user should kickback occur. In such an embodiment, at least the infeed guard portion may be biased toward the work surface, such as to a nominal configuration for the top guard, which causes the top guard to exert positive pressure against the workpiece when the top guard is deflected from this nominal configuration by the workpiece.

Similar to the example of FIG. 6, the infeed end region 174 of the top guard shown in FIG. 7 may be shaped to cause automatic deflection of at least the infeed guard portion responsive to the infeed end region being engaged by a workpiece as the workpiece is supported on the work surface and urged toward the spinning blade 22. The infeed guard portion of the example shown in FIG. 7 may be configured to bend or otherwise deflect between nominal and deflected configurations, similar to the example shown in FIG. 6. As another illustrative example, the top guard may be coupled to the splitter in a manner to define this limited range of deflection, or movement of the top guard, as the top guard is initially engaged by the workpiece to be cut.

In FIGS. 6 and 7, top guards 140 are illustrated as having lower surfaces 144 with channels 160 into which the blade extends. As discussed, top guards that are coupled to the splitter at a higher relative elevation (such as so that the lower surface of the top guard is always positioned above the blade) are also within the scope of the present disclosure. In FIGS. 6 and 7, top guards 140 are coupled to splitter 52 by a pair of spaced-apart fastening mechanisms 152. As discussed, a variety of different fastening mechanisms may be utilized with splitter assemblies according to the present disclosure, with the illustrative type and number shown somewhat schematically in FIGS. 6 and 7 being illustrative, non-exclusive examples. For example, a greater or smaller number of fastening mechanisms may be used, one or more of the fastening mechanisms may be a reusable fastening mechanism (i.e., configured to be removed and replaced without destruction or damage to the fastening mechanism or other splitter assembly components), one or more of the fastening mechanisms may be a permanent fastening mechanism, etc. When all of the fastening mechanisms are reusable fastening mechanisms, the splitter assembly may be described as having a removable top guard and/or a top guard that is configured to be repeatedly removed from and reattached to the splitter. For example, in some situations it may be desirable to use the splitter without a top guard attached, such as to provide sufficient clearance for the workpiece.

In some embodiments, the top guard may be adapted to be selectively moved away from the work surface without completely detaching the top guard from the splitter or detaching the entire splitter assembly from the table saw. For example, when the saw is not being used to cut a workpiece, it may be desirable to have greater access to the blade, to throat 92, etc. An illustrative, non-exclusive mechanism for providing this selective access is to utilize at least a pair of spaced-apart fastening mechanisms 152, including a pivotal fastening mechanism 180 and a reusable fastening mechanism 182. In the context of fastening mechanisms 180 and 182, "spaced-apart" relates to the relative position of the fastening mechanisms with respect to the infeed region of the work surface (i.e., one fastening mechanism will be closer to the infeed region than the other, and thereby also farther away from the outfeed region of the work surface). Fastening mechanism 180 pivotally couples the top guard to the splitter. It is within the scope of the present disclosure that fastening mechanism 180 may also be a reusable fastening mechanism, such as to permit selective removal and replacement of the top guard relative to the splitter.

When reusable fastening mechanism 182 is operatively positioned to secure the top guard to the splitter, the top guard is secured in a position for using the guard as a hold-down guard. As discussed, this may include the top guard being secured in a fixed orientation relative to the work surface and/or within a permitted range of positions in which the upper-most position still restricts elevation of the workpiece away from the work surface. However, when the reusable fastening mechanism is removed, the top guard may be pivoted about fastening mechanism 180 away from the infeed region of the work surface, such as shown in dash-dot lines in FIG. 7. In such a configuration, the top guard may no longer be positively biased toward the work surface or configured to prevent a workpiece from being elevated from the work surface. Such a position, in which the top guard extends vertically from the splitter or even rearwardly from the splitter, may be referred to as a maintenance, or retracted, position. By "rearwardly from the splitter," it is meant that the infeed guard portion extends further away from the infeed region of the work surface than the outfeed guard portion. As an illustrative example, it may be desirable to pivot the top guard to the retracted position shown in FIG. 7, or even further away from the infeed region of the work surface, when the blade of the table saw is to be removed or when the throat of the table saw (or components of the table saw positioned beneath the throat) needs to be accessed.

FIG. 8 provides a graphical illustration that splitter assemblies 50 according to the present disclosure may include top guards 140 that are selectively coupled, or adjustable, within a range of predetermined mounting positions relative to the splitter. As shown, splitter 50 includes a plurality of bores, sockets, or other suitable mounts 184 for fastening mechanisms 152 to secure the top guard to the splitter. At least one of the fastening mechanisms may be a reusable fastening mechanism 182 and/or a pivotal fastening mechanism 180. As illustrative, non-exclusive graphical examples, a top guard 140 is shown in solid lines in FIG. 8 being secured to the splitter by a pair of spaced-apart fastening mechanisms 152, of which one of the fastening mechanisms is a reusable fastening mechanism and one of the fastening mechanisms is both a pivotal and a reusable fastening mechanism. In dashed lines in FIG. 8, top guard 140 is shown coupled to the splitter in a lower elevation than the previously discussed solid line example. As discussed, this selective adjustment of the relative height of the top guard relative to the splitter may be used for such applications as selecting whether the blade extends into the top guard and/or to adjust the top guard for use with thicker workpieces. In these initial examples, at least the outfeed guard portion 150 of the top guard is oriented in a horizontal, or generally horizontal orientation (i.e., parallel or generally parallel to the work surface). However, this is not required to all embodiments. To graphically illustrate this point, in dash-dot lines in FIG. 8, a top guard is shown secured to the splitter in an inclined orientation by two spaced-apart fastening mechanisms, with the top guard extending from the splitter at an inclined angle generally toward the work surface. Other relative orientations are possible.

This selective securement of the top guard in one of a discrete number of predetermined mounting positions relative to the splitter, when implemented, may enable a user to select the height, angle, and/or permitted range of positions of the top guard relative to the work surface. In the illustrated example, one or both of the depicted fastening mechanisms may be a reusable fastening mechanism and/or a pivotal fastening mechanism. It is within the scope of the present disclosure that the number and/or orientation of the mounts may vary from the illustrative example shown in FIG. 8. For example, additional laterally oriented mounts would permit adjustment of how far forward of the splitter the infeed end region of the top guard extends. Additionally or alternatively, top guard 140 may include a plurality of mounts bores, sockets, or other suitable mounts 186. As an illustrative, non-exclusive graphical example, the top guard shown in dashed lines in FIG. 8 is shown including a plurality of spaced-apart mounts 186 that are associated with each of the illustrated pair of fastening mechanisms 152. Similar to prior embodiments, the number, type, and position of the mounts (and fastening mechanisms) may vary without departing from the scope of the present disclosure.

Some top guards 140 that are implemented as hold-down guards according to the present disclosure may be pivotally coupled to the splitter during use of the top guard as a hold-down guard. By this it is meant that the top guard is pivotal relative to the splitter within a defined range of positions in which the top guard limits the upward movement of a workpiece away from the work surface, with such pivotal top guards optionally also positively retaining the workpiece against the work surface within this range of positions. This is distinguishable from a pivotal blade guard that is freely pivotal relative to the splitter, such as to, or even beyond, the previously discussed retracted position. In other words, such a freely pivotal guard is urged toward the work surface and/or against a workpiece merely by the weight of the guard itself. In contrast, a pivotal hold-down guard according to the present disclosure is designed to restrict, or even prevent, a workpiece being cut by the saw from being thrust upward and toward a user regardless of the relative position of the pivotal top guard within its predetermined range of positions relative to the splitter. Although not required to all embodiments, it is within the scope of the present disclosure that a pivotal top guard that is implemented as a hold-down guard may be coupled to the splitter without requiring a frictional clamp or retainer to prevent pivoting of the top guard relative to the splitter.

Figure 9:
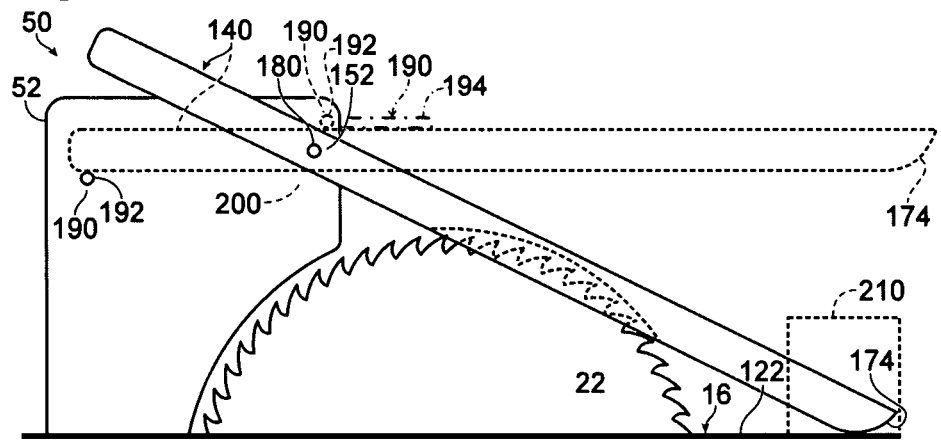
FIG. 9 is a side elevation view of another illustrative, non-exclusive example of a splitter assembly according to the present disclosure.

An illustrative, non-exclusive example of a splitter assembly with a splitter assembly 50 and a pivotal top guard 140 according to the present disclosure is shown in FIG. 9. In the illustrated example, the outfeed guard portion is pivotally coupled to splitter 52 by a fastening mechanism 152 in the form of a pivotal fastening mechanism 180. As discussed in more detail herein, other pivotal couplings are possible and within the scope of the present disclosure, including pivotal top guards in which a portion of the top guard is secured in a non-pivotal orientation the to the splitter, and with another portion of the top guard being coupled for pivotal movement relative to the splitter. When top guard 140 is pivotally coupled to the splitter, portions of the outfeed guard portion will typically extend on both sides of the splitter.

Pivotal hold-down guards according to the present disclosure are pivotal within a permitted range of pivotal positions that is bounded by an upper pivotal position and a lower pivotal position. In at least the upper pivotal position, the top-guard restricts upward movement of the workpiece being cut away from infeed region 122 of the work surface 16. Accordingly, splitter assemblies 50 that include pivotal top guards 140 also include an upward pivot stop 190 that defines the upper pivotal position of the top guard relative to the splitter. More specifically, the upward pivot stop restricts further upward pivoting of the top guard relative to the splitter. An illustrative, non-exclusive example of a suitable pivot stop 190 is the previously discussed brace 172. Another illustrative example is a projection, or projecting member, that extends from the splitter and which is engaged by the top guard to restrict further pivotal movement of the top guard away from the work surface. Yet a further illustrative, non-exclusive example is a projection, or projecting member, that extends from the top guard and which engages the splitter to restrict further pivotal movement of the top guard away from the work surface. Still further illustrative examples of pivot stops include braces, clips, and the like. In other words, the upward pivot stop may be positioned at any suitable location on the splitter and/or the top guard.

Several illustrative, non-exclusive examples of suitable upper pivot stops 190 are graphically illustrated in FIG. 9. At 192, a projection is shown extending from the splitter in a position where the projection will be engaged by the lower surface of the outfeed guard portion of top guard to define the upper pivotal position of the top guard relative to the splitter and/or work surface. As another example, projection 192 is shown in dashed lines positioned for engagement by the upper surface of the outfeed guard portion of the top guard to define the upper pivotal position of the top guard relative to the splitter and/or work surface. As a further example, an upper pivot stop 190 in the form of a brace 194 that extends forwardly from the splitter is also shown in FIG. 9. Brace 194 extends at a fixed orientation relative to the splitter, with this orientation defining the upper pivotal position of the pivotal top guard during use of the top guard as a hold-down guard. Depending upon such factors as the thickness of the outfeed guard portion and the desired pivotal range of positions for the top guard, the top guard may include a track, race, or other elongate recess, into which a projection or other pivot stop extends, with at least the upper pivotal position of the top guard being defined by the engagement of an end region of the track by the projection.

Pivot stop 190 may extend from one lateral side of the splitter, from both lateral sides, or through the splitter without departing from the scope of the present disclosure. Pivot stop 190 may be an integral portion of the splitter, may be permanently secured to the splitter, and/or may be removably coupled to the splitter. When pivot stop 190 is removably coupled to the splitter and/or guard, the pivot stop may be selectively removed from the splitter to permit selective replacement or repositioning of the pivot stop and/or to permit pivoting of the top guard to a retracted position, such as previously discussed with respect to FIG. 7, and/or to permit use of the pivotal top guard in a manner in which the top guard is not configured to be a hold-down guard. As discussed previously, in the context of pivot stops, "removably" refers to the pivot stop and/or splitter (or other portion of the splitter assembly to which the pivot stop is coupled) being configured for repeated removal and reattachment of the pivot stop without destruction of any portion of the pivot stop, splitter, top guard, or any fastening mechanism used to secure the pivot stop in a selected position. In contrast, a permanent pivot stop, which is also within the scope of the present disclosure, is not removable without destruction or damage to at least one of the above-listed components.

Figure 10:
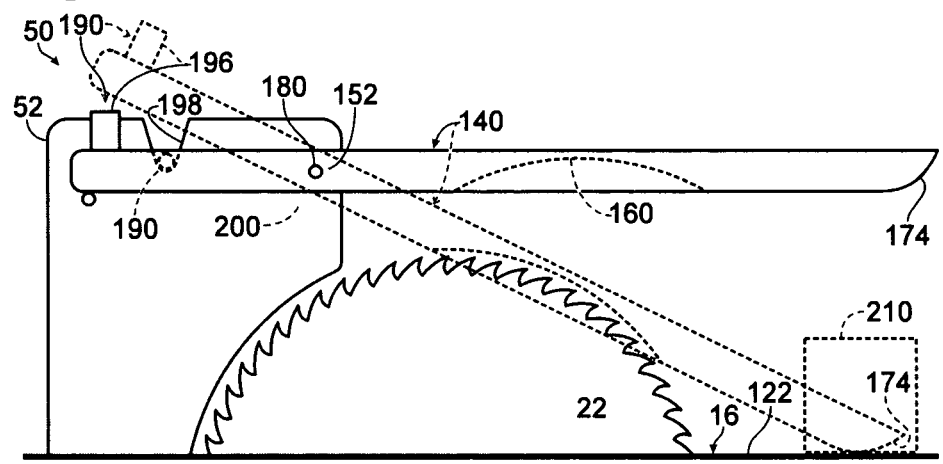
FIG. 10 is a side elevation view of another illustrative, non-exclusive example of a splitter assembly according to the present disclosure.

In FIG. 10, illustrative, non-exclusive examples of upper pivot stops 190 that permanently or removably extend from the top guard and/or which otherwise form a portion of the top guard are shown. In such an embodiment, the pivot stop selectively engages the splitter to define the upper pivotal position of the top guard away from the infeed region of the work surface. In the illustrated example, the upper pivot stop 190 takes the form of a spanning member, or linkage, 196 that extends in a position to engage the splitter, such as an upper surface of the splitter, to define the upper pivotal position of a pivotal top guard that is being used as a hold-down guard. As a variant, the upper pivot stop may extend into a passage within the splitter, with the upper pivotal position of the top guard when the top guard is being utilized as a hold-down guard being defined when the upper pivot stop engages an end region of the passage. An example of this variant is illustrated in dashed lines in FIG. 10, with upper pivot stop 190 being pivotal within a passage 198 in the splitter to define the upper pivotal position of the top guard. As a further variant, if the passage includes a closed upper region, then the lower pivotal position of the pivotal top guard may also be defined when the pivot stop, which is this case may be referred to as a lower pivot stop, engages the closed upper region of the passage in the splitter.

As introduced above in connection with a lower pivot stop, the pivotal range of positions for a pivotal top guard according to the present disclosure may include a lower pivotal position. In some embodiments, this lower pivotal position may be defined by a lower pivot stop, and in some embodiments a single pivot stop functions as both the upper pivot stop and a lower pivot stop. For some pivotal top guards, including pivotal hold-down top guards according to the present disclosure, the lower pivotal position of the top guard corresponds to a position in which the infeed end region 174 of the top guard engages the infeed region of the work surface, at least when a workpiece is not present at the infeed region of the work surface. However, engagement with the infeed region of the work surface is not required to all embodiments, and some pivotal top guards may be configured to have a lower pivotal position in which the infeed end region of the top guard does not engage the work surface. In some embodiments, the infeed end region may or may not engage the infeed region of the work surface, such as depending upon the relative user-selected height of the blade and splitter above the work surface.

When top guard 140 is configured to be pivotally coupled to the splitter, the splitter assembly may include an optional pivot biasing mechanism 200 that is adapted to bias the pivotal movement of the top guard in a particular direction relative to the pivotal fastening mechanism and/or to a particular predetermined orientation. In some embodiments, it may be desirable to bias the infeed guard portion of the top guard toward the infeed region of the work surface. In some embodiments, it may be desirable to bias the infeed guard portion of the top guard away from the infeed region of the work surface. Both of these illustrative, non-exclusive examples are within the scope of the present disclosure. When present, pivot biasing mechanism may take any suitable form. Illustrative, non-exclusive examples include springs (such as coil, leaf, compression, and/or extension springs), elastomeric members, and resilient compressible members. It follows that suitable mounting positions for the biasing mechanism will tend to vary depending upon the particular type of biasing mechanism being utilized in a particular embodiment.

With reference to the illustrative examples shown in FIGS. 9 and 10, illustrative, non-exclusive examples of pivot biasing mechanisms 200 include a torsion spring associated with pivotal fastening mechanism 180, an elastomeric member, resilient compressible member, or spring extending between the splitter and the top guard, the splitter and a pivot stop, a pivot stop and the top guard, etc. In some embodiments, the weight of the top guard may be sufficient to bias the top guard to a particular position within its predetermined range of positions, such as to the upper pivotal position or the lower pivotal position. It is within the scope of the present disclosure for the shape, size and/or material(s) of construction of the top guard and/or the relative pivotal mounting position of the top guard to the splitter to be selected to bias the top guard to a particular position. Similarly, the pivot biasing mechanism may be implemented as a weight that is selectively positioned on, in, or along the top guard to bias the top guard to its upper pivot position or its lower pivot position.

When the top guard and/or splitter includes a plurality of mounts 184 and/or 186, such as discussed previously with respect to FIG. 8, these mounts may additionally or alternatively be utilized to removably secure pivot stops (upper and/or lower) to the splitter assembly to define at least one or both of an upper pivot position and a dower pivot position of a pivotal top-guard, such as may be used as a hold-down guard. Illustrative, non-exclusive graphical examples are shown in FIG. 11 using the splitter from FIG. 8. In solid lines, a pivotal top-guard 140 is shown pivotally coupled to the splitter by a fastening mechanism 152 in the form of a pivotal fastening mechanism 180, which optionally may also be a reusable fastening mechanism. Furthermore, an upper pivot stop 196 and a lower pivot stop 202 are shown and define the upper and lower pivot positions of the pivotal top guard within its range of positions for use as a hold-down guard. The pivot stops may be removable pivot stops, which provide user-selected adjustability to the range of positions and/or to the upper and/or lower pivot positions. For example, removing upper pivot stop 196 permits use of the top guard without the top guard being a hold-down guard. Removing the lower pivot stop permits the lower pivot position of the top guard to be defined by where the infeed end region of the top guard engages infeed region 122 of the work surface. Repositioning of the pivot stops to another of the mounts 184 and/or repositioning of pivotal fastening mechanism 182 permits adjustment of the relative pivotal range of positions. Addition of a second fastening mechanism, such as indicated in dashed lines at 152, permits use of the top guard as a non-pivotal hold-down guard.

A consideration with top guards 140 according to the present disclosure is that the movement of the workpiece from the infeed region of the table to the spinning blade should not be impeded or otherwise impaired by the top guard, such as the infeed end region 174 of the top guard. When top guard 140 is a pivotal top guard that is pivotal relative to the work surface during use of the table saw to cut a workpiece, the splitter assembly may be adapted to position or otherwise configure the top guard so that at least the infeed guard portion does not obstruct movement of the workpiece along the work surface toward the spinning blade when/if the workpiece engages the infeed end region of the top guard. For example, this potential for impeding movement of the workpiece toward the spinning blade may occur with a pivotal top guard in which the infeed end region extends, in its nominal position, into contact with the infeed region of the work surface or otherwise extends closer to the infeed region than the thickness of the workpiece to be cut. Top guards 140 having at least an infeed end region that is configured to be deflected from a nominal position to a deflected position by engagement with the workpiece also should be constructed so as not to impede the movement of the workpiece along the infeed region of the work surface toward the spinning blade.

Accordingly, top guards 140 according to the present disclosure may include an optional lift mechanism 210. When present, such a lift mechanism is configured to automatically pivot or otherwise deflect or move at least the infeed guard portion generally upwardly away from the infeed region of the work surface responsive to the workpiece contacting the infeed end region or the lift mechanism of the top guard. Typically, this contact will be initiated by the leading edge or top surface of the workpiece as the workpiece is slid along the infeed region of the work surface toward the spinning blade. Some lift mechanisms 210 according to the present disclosure may be described as being configured to translate a horizontal force imparted thereto by the leading edge of the workpiece into a generally vertical force that sufficiently elevates the lift mechanism, and corresponding portion of the top guard, away from the work surface that the movement of the workpiece horizontally along the infeed region of the work surface toward the spinning blade 122 is not prevented or otherwise obstructed by the top guard.

In FIGS. 9-11, a lift mechanism 210 has been schematically illustrated as being associated with the infeed end region 174 of the top guard. Lift mechanism 210 may include any suitable structure and/or mechanism for providing the above-described movement of at least the infeed end region of the top guard responsive to engagement by the workpiece. FIGS. 12-15 provide less schematic illustrative, non-exclusive examples of lift mechanisms 210 that may be used with top guards 140 according to the present disclosure. FIGS. 12-15 illustrate the lift mechanisms implemented on pivotal top guards, but it is within the scope of the present disclosure that the lift mechanisms may also be implemented on deflectable top guards. Additional illustrative, non-exclusive examples of lift mechanisms are disclosed in U.S. Pat. Nos. 307,112, 1,381,612, 1,101,515, 3,105,530, and 3,880,032.

Figure 12:
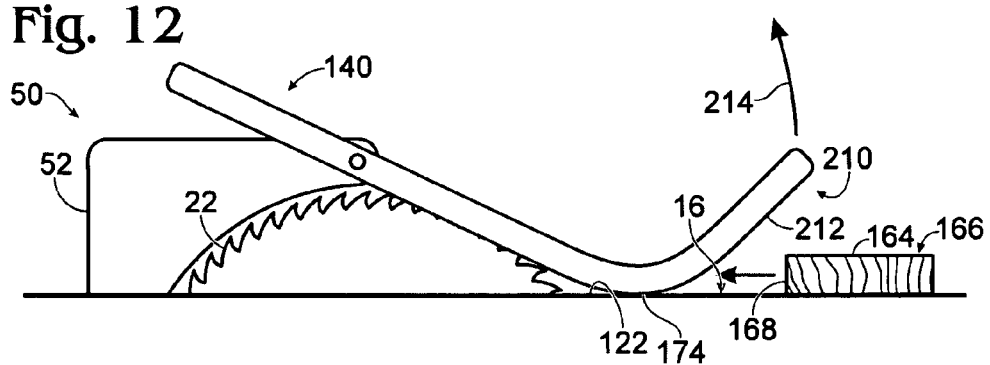
FIG. 12 is a side elevation view of another illustrative, non-exclusive example of a splitter assembly according to the present disclosure.

In FIG. 12, splitter assembly 50 includes a splitter 52 with a top guard 140 with an infeed end region 174 that includes a lift mechanism 210 in the form of a projecting member, or snout, 212. Snout 212 projects forwardly (i.e., generally away from the outfeed guard portion) and upwardly (i.e., generally away from the work surface) from the infeed guard portion of the top guard. As illustrated, snout 212 has an arcuate shape, but other configurations may be used. Snout 212 may project from the infeed end region, may be attached to the infeed end region, may have a different width, thickness, and/or material(s) of construction than the infeed end region, and/or may be integrated with or form a portion of the infeed end region without departing from the scope of the present disclosure. When workpiece 166 is moved along the infeed region 122 of work surface 160 toward blade 22, the leading edge 168 of the workpiece will initially engage snout 212.

When top guard 140 is in its nominal position, snout 212 should be oriented at a suitable angle to translate the forces imparted thereto by the workpiece, such as by the leading edge of the workpiece, into a lifting movement of at least the infeed end region of the top guard. Expressed in slightly different terms, the snout should be oriented so that the forces imparted thereto by the workpiece result in movement of at least the infeed end region of the top guard sufficiently away from the infeed region of the work surface so as not to obstruct or impede further movement of the workpiece toward blade 122. This movement is schematically indicated in FIG. 12 with arrow 214. As discussed, this movement may be pivotal movement, translational movement, deflecting movement, etc. and may be of the entire top guard, or only a portion (such as the infeed guard portion) thereof.

Figure 13:
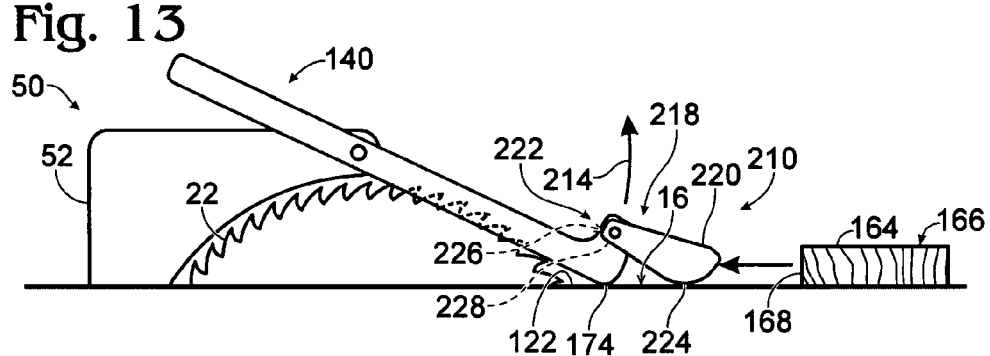
FIG. 13 is a side elevation view of another illustrative, non-exclusive example of a splitter assembly according to the present disclosure.

FIG. 13 illustrates another illustrative, non-exclusive example of a lift mechanism 210 that may be used with top guards 140 according to the present disclosure. As illustrated, lift mechanism 210 is pivotally coupled to the top guard, such as to the infeed end region 174 or infeed guard portion 148 thereof. As such, lift mechanism 210 may be referred to as a pivotal lift mechanism 218. Pivotal lift mechanism 218 is adapted to pivot responsive to engagement by the leading edge 168 of workpiece 166, with this pivotal movement causing the lift mechanism to engage infeed region 122 of work surface 16 and thereby elevate, or "push," at least the infeed guard portion of the top guard away from the work surface. In the illustrated example, the pivotal lift mechanism includes a projecting member 220 that is pivotally coupled to the top guard, such as at a pivot 222. The projecting member includes a contact region 224 that is positioned, when the top guard is in its nominal position, for engagement by the leading edge of the workpiece. As illustrated, contact region 224 is closer to the infeed region of the work surface than pivot 222 when the top guard is in its nominal position. However, contact region 224 is not in engagement with the infeed region of the work surface. Instead, the contact region is positioned above the work surface when the top guard is in its nominal position, with the projecting member being shaped to elevate at least the infeed region portion of the top guard as the contact region is engaged by the workpiece and urged into contact with the work surface. The illustrated projecting member includes an arcuate, or curved, transition region 226 extending between the contact region and the work surface, although other shapes and configurations may be utilized without departing from the scope of the present disclosure. Projecting member 220 may be biased to return to the illustrated, nominal, position by any suitable lift mechanism biasing mechanism 226, an illustrative, non-exclusive example of which is a torsion spring 228 associated with the pivot 222. It is within the scope of the present disclosure that other biasing mechanisms, such as those elsewhere discussed, illustrated, and/or incorporated herein, may be used for lift mechanism biasing mechanism 226.

Pivotal lift mechanisms 218 respond to engagement by the leading edge of a workpiece to be cut by engaging the work surface to lift or otherwise elevate or move at least the infeed end region of the top guard away from the infeed region of the work surface to provide clearance for the workpiece to pass thereunder. However, pivotal lift mechanisms 218 themselves should be constructed and/or positioned relative to the top guard so as not to impede or otherwise prevent further forward movement of the workpiece along the infeed region of the work surface toward the blade. In the illustrative example shown in FIG. 13, lift mechanism 218 should be configured or positioned so that the projecting member does not prevent further movement of the workpiece toward the blade after the projecting member has been pivoted from the illustrated nominal position.

Figure 14:
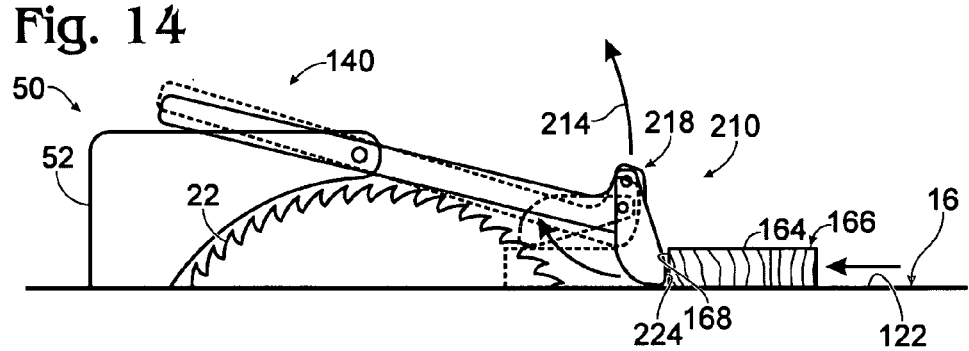
FIG. 14 is a side elevation view of another illustrative, non-exclusive example of a splitter assembly according to the present disclosure.

As an illustrative, non-exclusive example, the projecting member may be permitted to pivot beyond a vertical (downwardly oriented) orientation by the engagement with the leading edge of the workpiece. FIG. 14 illustrates an example of such a vertical position in solid lines, and a further pivoted position in dashed lines. It should be understood that the projecting member in the illustrated embodiment should not contact the spinning blade. As such, the projecting member may be offset from the blade and/or may include a central passage or channel into which the blade extends. Infeed region 148 of the top guard may also include a suitable recess or passage to permit this pivotal range of movement of the projecting member. As a further example, a pivotal lift mechanism may include more than one pivotal projecting member, such as with a projecting member extending proximate each lateral side of the blade. As another variation, the top guard may be sufficiently long or otherwise extend sufficiently forward of the blade that the pivotal projecting member may be pivoted to the position shown in dashed lines in FIG. 14 (or even beyond) without engaging the blade. As discussed, pivotal lift mechanisms 218 may include a lift mechanism biasing mechanism that is adapted to pivot the projecting member back to its nominal position, such as after removal of the workpiece from the work surface, or at least the infeed region thereof.

It is also within the scope of the present disclosure for a top guard 140, including a top guard that is configured to be a hold-down guard, to include an infeed guard portion 148 that is directly or indirectly coupled for pivotal movement relative to the outfeed guard portion 150. For example, the outfeed guard portion may be secured to a splitter in one of the above discussed manners, such as in a fixed position, or within a selected one of a predetermined number of predefined positions. The infeed guard portion is pivotally connected to the outfeed guard portion and thereby configured to pivot within a range of positions relative thereto. Such a top guard may be referred to herein as a partial-pivotal top guard. When such a top guard is to be utilized as a hold-down guard, the top guard or other portion of the splitter assembly may include a suitable pivot stop, such as in accordance with the various illustrative examples that have been discussed, illustrated, and/or incorporated herein.

FIG. 15 provides an illustrative, non-exclusive example of such a top guard 140. As shown, outfeed guard portion 150 is secured in a fixed orientation relative to splitter 52 by a pair of fastening mechanisms 152, and infeed guard portion 148 is pivotally coupled to the outfeed guard portion. Infeed guard portion may be pivotally coupled directly or indirectly to outfeed guard portion 150 without departing from the scope of the present disclosure. Any suitable pivotal linkage may be utilized to provide the pivotal connection between the infeed and outfeed guard portions, with reference numeral 240 schematically representing such a pivotal linkage. By "directly," it is meant that the infeed and outfeed guard portions may extend in physical contact with each other, albeit with a pivotal interconnection. By "indirectly," it is meant that that infeed and outfeed guard portions are not in direct physical contact with each other, at least when the top guard is in its nominal configuration. Instead, the infeed and outfeed guard portions are pivotally secured together by an intermediate structure, such as a central guard portion, a pivotal linkage that separates the infeed and outfeed guard portions, etc.

The infeed and outfeed guard portions of a partial-pivotal top guard according to the present disclosure may have the same, similar, or different properties (including, but not limited to, one or more of relative length, thickness, width, number of components, and materials of construction). In some embodiments, outfeed guard portion will extend over at least a portion of the blade, and may extend above at least a substantial portion of the blade. Accordingly, the pivotal infeed guard portion may extend over a portion of the blade, only a minority portion of the blade, or none of the blade, without departing from the scope of the present disclosure. Either or both of the infeed and outfeed guard portions may include a channel 160 in their respective lower surfaces into which the blade may extend during use of the top guard while a workpiece is being cut by the spinning blade.

FIG. 16 illustrates another illustrative, non-exclusive example of a partial-pivotal top guard 140 according to the present disclosure in which the infeed and outfeed guard portions are pivotally coupled together. As illustrated, the infeed and outfeed guard portions 148 and 150 are pivotally coupled together such that the infeed guard portion is pivotal relative to the outfeed guard portion and splitter 52 of splitter assembly 50.

For the sake of brevity, all of the previously discussed features, optional components, variants, and the like that have elsewhere been described, illustrated, and/or incorporated herein with respect to other top guards will not be discussed again with respect to the partial-pivotal top guards. Instead, it is within the scope of the present disclosure that the various table saw components, splitters, mounting mechanisms, fastening mechanisms, lift mechanisms, defined positions, biasing mechanisms, top guard configurations, splitter accessory components, and variants thereof, that are described, illustrated, and/or incorporated herein may be (but are not required to be) used with partial-pivotal top guards. For example, optional lift mechanism 210 is schematically illustrated in FIG. 15, and the fastening mechanism(s) that secure the outfeed guard portion to the splitter is (are) generally indicated at 152. Similar to other embodiments of splitter assemblies discussed herein, the type and number of fastening mechanisms may vary within the scope of the present disclosure.

When configured to be a hold-down guard, partial-pivotal top guards according to the present disclosure may provide the desired hold-down function with the outfeed guard portion, the infeed guard portion, or both. For example, the outfeed guard portion may provide the hold-down function of the top guard. Additionally or alternatively, the top guard may include a pivot stop 190 that defines the upper pivotal position of the infeed guard portion relative to the outfeed guard portion and which defines an upper pivotal position in which the infeed guard portion functions as a hold-down guard. When the partial-pivotal top guard is a hold-down guard in which the outfeed guard portion provides the hold-down function, then pivot stop 190 may be omitted without destroying the hold-down property of the top guard.

Figure 17:
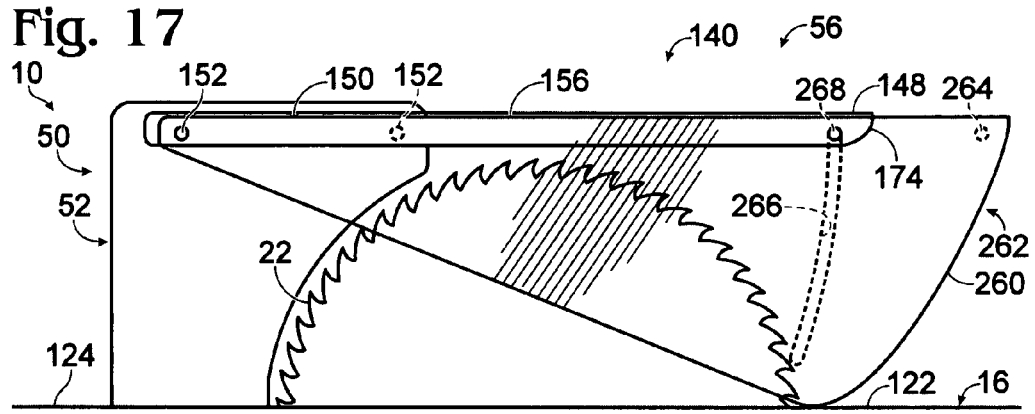
FIG. 17 is a side elevation view of another illustrative, non-exclusive example of a splitter assembly according to the present disclosure.
Figure 18:
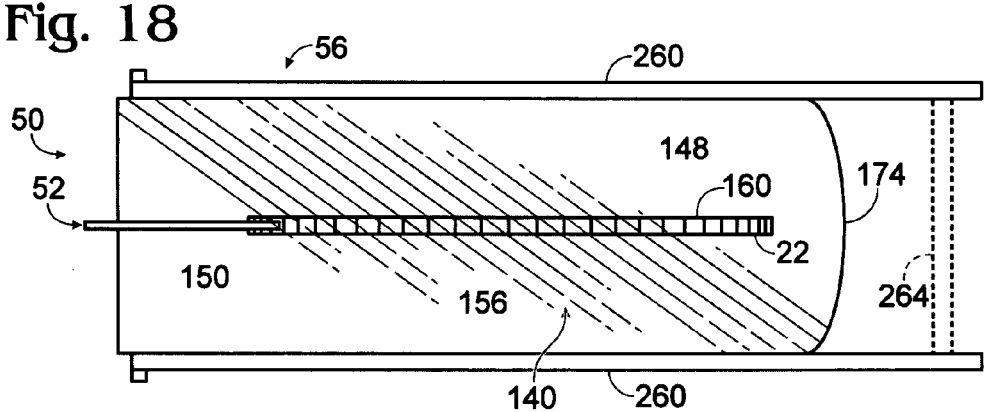
FIG. 18 is a side elevation view of another illustrative, non-exclusive example of a splitter assembly according to the present disclosure.

As discussed, splitter assemblies 50 according to the present disclosure may include components in addition to a top guard 140 and a splitter 52. An illustrative, non-exclusive example of such a component is a blade guard 56 that includes at least one, and typically two, side guards in addition to a top guard 140. An illustrative, non-exclusive example of such a blade guard is shown in FIGS. 17 and 18, with side guards being indicated at 260. It is within the scope of the present disclosure that the side guards 260 that are described, illustrated, and/or incorporated herein may be utilized with any top guards and/or splitter assemblies that are described, illustrated, and/or incorporated herein without departing from the scope of the present disclosure.

In the illustrated example, the side guards are pivotally coupled to the outfeed guard portion 150 of the top guard. However, it is within the scope of the present disclosure that guards 56 that include one or more side guards 260 may have these side guards coupled to any suitable portion of the splitter assembly. Illustrative, non-exclusive examples of such portions include a central region 156 of the top guard, an infeed guard portion 148 of the top guard, the infeed end region 174 of the top guard, and splitter 52. Side guards 260 may be sized and/or positioned relative to the blade to provide a physical barrier between at least a portion of the blade and a user's body. In some embodiments, the side guard(s) may be sized and/or positioned to provide a barrier that extends from the splitter to the infeed region of the work surface. Illustrative, non-exclusive examples of additional side guards 260 that may be used with top guards according to the present disclosure are disclosed in U.S. Patent Publication No. 2007/0000336 and in U.S. Pat. Nos. 264,412, 545,504, and 1,037,843.

When a guard 56 includes two or more side guards 260, the side guards may be referred to collectively as a side guard assembly 262. When, blade guard 56 includes a side guard assembly 262 with at least one side guard 260 on each lateral side of the blade, the side guards may be configured to move as a unit with each other relative to the blade, to move independently of each other relative to the blade, or to move responsive to each other relative to the blade. It is also within the scope of the present disclosure that the side guards may be coupled to move with, relative to, or independent of the corresponding top guard 140. In FIGS. 17 and 18, an optional side guard linkage 264 is shown interconnecting a pair of side guards that extend on opposed sides of top guard 140. Also shown in FIG. 17 is an optional guide 266 in which a projection 268 from the top guard extends.

Figure 19:
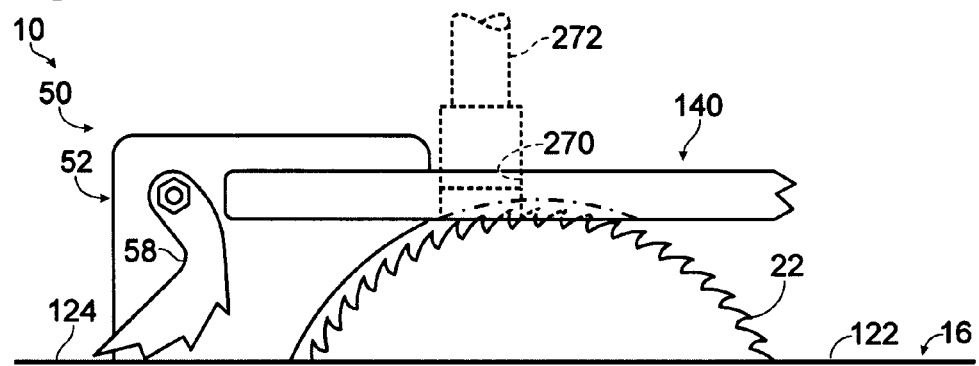
FIG. 19 is a fragmentary side elevation view of another illustrative, non-exclusive example of a splitter assembly according to the present disclosure.

Another example of such an optional component is an anti-kickback pawl or other mechanism that is positioned rearward of the saw's arbor to engage the workpiece, or at least prevent the workpiece from being thrust forward and upward toward a user. An illustrative, non-exclusive example of an anti-kickback mechanism 58 is shown in FIG. 19. When present, mechanism 58 may be coupled to one or both of splitter 52 and blade guard 56. Illustrative, non-exclusive examples of suitable anti-kickback mechanism are disclosed in U.S. Pat. Nos. 4,615,247, 4,418,597, 3,232,326, 2,095,330, and 1,526,128, and in U.S. Patent Application Publication No. 2005/0166736. Some splitter assemblies may include two or more anti-kickback mechanisms 58, with such mechanisms having the same or different shapes, mechanisms, and/or configurations. In some embodiments, the anti-kickback mechanisms may be spring-biased anti-kickback mechanisms.

A further example of an optional component that may be utilized with splitter assemblies according to the present disclosure is a duct, or port, 270 for attaching a hose or other collection tube 272 for a vacuum or other dust collection mechanism, such as may utilize a suction source to withdraw particulate produced when cutting a workpiece with the saw's blade. An illustrative, non-exclusive example of such a port is shown in FIG. 19. As illustrated, port 270 extends through top guard 140 to permit the dust collection mechanism to suck or otherwise draw sawdust and other particulate away from the blade through the port in the top guard. Dust collection port 270 may have any suitable size and geometry, such as for directly or indirectly interfacing with a dust collection tube of a dust collection system. In some embodiments, the port may have a circular cross-sectional area and/or a cross-sectional area of at least 0.75 in$^2$ (square inches), at least 1 in$^2$, at least 2 in$^2$, etc. In some embodiments of a top guard that includes such a dust collection port, the top guard may be configured to be a hold-down guard. In some embodiments, the top guard may include a blade-receiving channel (160), which in some embodiments may be fluidly connected to the dust collection port so that particulate may be drawn through the channel and into the port. In some embodiments, the top guard may also include side guards that assist in enabling a dust collection system to draw though the dust collection port particulate created during the cutting of a workpiece by the blade.

INDUSTRIAL APPLICABILITY

The guards and table saws disclosed herein are applicable to the woodworking and power-operated machine industries, including table saws such as cabinet saws, contractor saws, hybrid saws, jobsite saws, and bench top saws.

The invention claimed is:

1. A table saw, comprising:
   a table having a work surface with an infeed region and an outfeed region;
   a nominally planar, circular blade configured to extend at least partially above the work surface to cut a workpiece on the work surface as the workpiece is moved into contact with the blade, wherein the blade has an orientation relative to the work surface;
   a motor to drive rotation of the blade relative to the work surface;
   a splitter having an orientation relative to the work surface;
   a mounting mechanism configured to position the splitter adjacent the blade;
   a blade adjustment mechanism configured to change the orientation of the blade and the splitter relative to the work surface; and
   a blade guard extending from the splitter generally toward the infeed region of the work surface, wherein the blade guard includes a top guard having an upper surface that extends generally above the blade and a lower surface, wherein the top guard includes an outfeed guard portion that extends from the splitter, and an infeed guard portion that extends generally toward the work surface relative to the outfeed guard portion, wherein the top guard is configured to positively retain the workpiece against the work surface, wherein at least the infeed guard portion is configured for movement in a range of positions between a nominal position, in which the infeed guard portion extends generally toward the work surface relative to the outfeed guard portion, and a deflected position, in which the infeed guard portion is deflected away from the work surface relative to the nominal position.

2. The table saw of claim 1, wherein the infeed guard portion is configured to positively retain the workpiece against the work surface.

3. The table saw of claim 1, wherein in the deflected position, the lower surface of the top guard at the infeed guard portion is restricted to be at most coplanar with the lower surface of the top guard at the outfeed guard portion.

4. The table saw of claim 1, wherein the blade has a radius, and further wherein the vertical distance between the nominal position and the deflected position of the infeed guard portion is less than 50% of the radius of the blade.

5. The table saw of claim 1, wherein the infeed guard portion resiliently extends from the outfeed guard portion within the range of operable positions, and further wherein the infeed guard portion is biased toward the nominal position.

6. The table saw of claim 1, wherein the infeed guard portion is pivotally coupled to the outfeed guard portion for pivotal movement within a pivotal range of positions.

7. The table saw of claim 6, wherein the pivotal range of positions includes an upper pivotal position, and further comprising a pivot stop that defines the upper pivotal position by restricting the pivotal movement of the infeed guard portion away from the infeed region of the work surface.

8. The table saw of claim 7, wherein the pivot stop restricts the pivotal range of movement of the infeed guard portion relative to the outfeed guard portion such that the infeed guard portion is restricted from pivoting beyond a deflected configuration in which the infeed guard portion extends generally parallel to the work surface.

9. The table saw of claim 1, wherein the outfeed guard portion is permanently secured to the splitter by a fastening mechanism such that the outfeed guard portion cannot be removed from the splitter without destruction of at least a portion of one or more of the outfeed guard portion, the splitter, or the fastening mechanism.

10. The table saw of claim 1, wherein the outfeed guard portion extends in a fixed orientation relative to the splitter.

11. The table saw of claim 1, wherein the blade includes a central bore through which an arbor of the table saw extends, and further wherein the top guard is adapted to positively retain the workpiece against the work surface from a position toward the infeed region of the work surface relative to the central bore of the blade.

12. The table saw of claim 11, wherein the top guard is further adapted to positively retain the workpiece against the work surface from a position toward the outfeed region of the work surface relative to the central bore of the blade.

* * * * *